United States Patent
Alba Rubio et al.

(10) Patent No.: US 12,498,345 B2
(45) Date of Patent: Dec. 16, 2025

(54) NANOCOMPOSITE OF MOLYBDENUM OXIDE AND CONDUCTIVE CARBON FOR FORMALDEHYDE GAS DETECTION AT ROOM TEMPERATURE

(71) Applicant: The University of Toledo, Toledo, OH (US)

(72) Inventors: Ana C. Alba Rubio, Toledo, OH (US); Dong-shik Kim, Toledo, OH (US); Haidar Alolaywi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 302 days.

(21) Appl. No.: 18/265,788

(22) PCT Filed: Dec. 6, 2021

(86) PCT No.: PCT/US2021/061948
§ 371 (c)(1),
(2) Date: Jun. 7, 2023

(87) PCT Pub. No.: WO2022/125414
PCT Pub. Date: Jun. 16, 2022

(65) Prior Publication Data
US 2024/0118237 A1    Apr. 11, 2024

Related U.S. Application Data

(60) Provisional application No. 63/122,621, filed on Dec. 8, 2020.

(51) Int. Cl.
*G01N 27/48* (2006.01)
*G01N 27/407* (2006.01)

(52) U.S. Cl.
CPC ..... *G01N 27/4076* (2013.01); *G01N 27/4073* (2013.01); *G01N 27/4074* (2013.01); *G01N 27/4075* (2013.01); *G01N 27/48* (2013.01)

(58) Field of Classification Search
CPC .. G01N 27/4076; G01N 27/48; G01N 27/406; G01N 27/407; G01N 27/4073–4075
See application file for complete search history.

(56) References Cited

U.S. PATENT DOCUMENTS

| | | | |
|---|---|---|---|
| 8,573,030 B2 | 11/2013 | Gole | |
| 8,702,962 B1 * | 4/2014 | Hunter | G01N 33/004 |
| | | | 73/23.31 |

(Continued)

FOREIGN PATENT DOCUMENTS

| | | | | |
|---|---|---|---|---|
| CN | 112179963 A * | 1/2021 | | G01N 27/48 |
| JP | 4691687 B2 | 6/2011 | | |

OTHER PUBLICATIONS

Itoh et al., VOCs sensing properties of layered organic-inorganic hybrid thin films: MoO3 with various interlayer organic components, Materials Letters, vol. 62, Issues 17-18, pp. 3021-3023 (2008) (Year: 2008).*

(Continued)

*Primary Examiner* — James Lin
*Assistant Examiner* — Vivian A Tran
(74) *Attorney, Agent, or Firm* — MacMillan, Sobanski & Todd, LLC

(57) ABSTRACT

A sensor for formaldehyde gas, methods of making the same, and methods of using the same, are described.

16 Claims, 38 Drawing Sheets

(56) References Cited

U.S. PATENT DOCUMENTS

| | | | |
|---|---|---|---|
| 9,784,755 B2 | 10/2017 | Scheffler et al. | |
| 10,094,811 B2 | 10/2018 | Noh et al. | |
| 2002/0184939 A1* | 12/2002 | Yadav | G01N 33/0031 374/100 |
| 2003/0097929 A1* | 5/2003 | Watanabe | B01J 20/06 96/108 |
| 2004/0179970 A1 | 9/2004 | Matsubara et al. | |
| 2013/0202489 A1 | 8/2013 | Ong et al. | |

OTHER PUBLICATIONS

Auer et al., Carbons as supports for industrial precious metal catalysts, Applied Catalysis A: General, vol. 173, Issue 2, pp. 259-271 (1998) (Year: 1998).*

Itoh et al., Preparation of layered organic-inorganic nanohybrid thin films of molybdenum trioxide with polyaniline derivatives for aldehyde gas sensors of several tens ppb level, Sensors and Actuators B: Chemical, vol. 128, Issue 2, pp. 512-520 (2008) (Year: 2008).*

Carmo et al., Physical and electrochemical evaluation of commercial carbon black as electrocatalysts supports for DMFC applications, Journal of Power Sources, vol. 173, Issue 2, pp. 860-866 (2007) (Year: 2007).*

Yang et al., "An Electrochemical Sensor for Determination of Sulfite ($SO_3^{2-}$) in Water Based on Molybdenum Disulfide Flakes/Nafion Modified Electrode", International Journal of Electrochemical Science, (2020), vol. 15, pp. 10304-10314.

Flueckiger et al., "Microfabricated Formaldehyde Gas Sensors", Sensors, (2009), vol. 9, pp. 9196-9215.

PCT International Search Report and Written Opinion, Application No. PCT/US2021/061948, dated Mar. 30, 2022.

* cited by examiner

NANOCOMPOSITE OF MOLYBDENUM OXIDE AND CONDUCTIVE CARBON FOR FORMALDEHYDE GAS DETECTION AT ROOM TEMPERATURE

RELATED APPLICATIONS

This is the national phase entry of international application PCT/US2021/061948 filed under the authority of the Patent Cooperation Treaty on Dec. 6, 2021, published; which claims priority to U.S. Provisional Application No. 63/122,621 filed under 35 U.S.C. § 111 (b) on Dec. 8, 2020. The entire disclosure of each of the aforementioned applications is incorporated herein by reference for all purposes.

STATEMENT REGARDING FEDERALLY SPONSORED RESEARCH

This invention was made with government support under Grant Number 1817294 awarded by the National Science Foundation. The government has certain rights in this invention.

BACKGROUND

Volatile organic compounds (VOCs) are chemicals that have a high vapor pressure at ambient temperature. The impact of VOCs on human health is important, as they cause harmful effects on individuals who are exposed to certain concentrations during prolonged times. Both the concentration level and the time of exposure to VOCs are important factors that determine their harmfulness. Agriculture, transportation, and industrial processes are some of the sources of emissions of VOCs. VOCs are also found as ingredients in construction materials and household products, such as paints, carpets, and cleaning products.

Formaldehyde ($CH_2O$) has been classified as one of the most toxic carcinogens by both the World Health Organization (WHO) and the United States Environmental Protection Agency (US EPA). Since formaldehyde gas can damage the nervous and immune systems, the WHO has set a maximum of 30 min of exposure to 0.08 ppm of formaldehyde gas to minimize any health issues. Therefore, an accurate and rapid method to measure formaldehyde gas at low concentrations is necessary to prevent harmful effects on humans.

Various techniques have been developed for the detection of VOCs in the gas phase. Detection of VOCs is important in many different areas such as the petroleum industry, water separation processes, and indoor or outdoor air pollution from fuel combustion and paints. Conventional methods, such as gas chromatography and spectrophotometry, usually require large high-end equipment with practical limitations of mobility, high energy consumption, and inaccuracy. Therefore, there is a need for cost-effective, portable, and accurate sensors for detecting VOCs.

Since VOCs are harmful chemicals that can be easily found in different setups, various techniques for the detection of VOCs in the gas phase have been studied and developed, such as those based on gas chromatography, spectrophotometry, ion chromatography, and metal oxide semiconductors (MOSs). Examples of technologies for VOC detection include photoionization detectors, conductive polymers, semiconductor gas sensors, and potentiometric sensors. Semiconductor gas sensors can be fabricated with metal oxide semiconductors (MOSs) due to their high affinity with VOCs. MOS-based gas sensors usually operate at high temperatures (100-400° C.) to optimize sensing performance, which may cause a decrease in the selectivity due to the aggregation of nanocrystals of metal oxides on the sensor surface.

MOS-based gas sensors are relatively simple, cost effective, and require low-maintenance, making them useful for the detection and measurement of VOCs in the atmosphere. They also have the ability to be used for the detection of VOCs under practical conditions, such as inside buildings, car interiors, storage warehouses, and laboratories. Furthermore, MOS-based gas sensors are able to detect VOCs at concentrations as low as parts per million (ppm) or even parts per billion (ppb), and the sensitivity is related to the surface area of the MOS, which is the sensing element of the gas sensor. Tin (IV) oxide ($SnO_2$), indium (III) oxide ($In_2O_3$), zinc oxide (ZnO), and titanium dioxide ($TiO_2$) are some examples of MOSs used in electrochemical sensors for the detection of VOCs.

MOS-based gas sensors demonstrate high sensitivity with VOCs as many of them detect VOCs at concentrations as low as parts per billion (ppb), compared to other methods with limits of detection of parts per million. In addition to the high sensitivity, MOS-based gas sensors have other advantages, such as simple fabrication procedures, low costs, minimum maintenance requirements, and simple measurement of electrical resistance in the sensor electrode, all of which make them useful for detecting VOCs in the gas phase.

Because MOS-based gas sensors consisting of bulk MOSs have been found to be not sensitive enough to detect VOCs at low concentrations, various noble metal nanoparticles, such as gold, silver, and palladium have been used to enhance the sensitivity and selectivity of the MOS-based gas sensors. Additionally, different fabrication methods have been used to synthesize MOS heterostructures, such as NiO/ZnO and $WO_3/SnO_2$, to provide improved sensitivity while reducing the operating temperature. Doping MOSs with elements such as Al, Mn, Sn, and Cu is another strategy for enhancing the selectivity of MOS sensors. Some organic polymers such as polyaniline (PANI), poly(5,6,7,8-tetrahydro-1-naphthylamine) (PTHNA), and poly-o-anisidine (PoANIS) have also been used to improve the selectivity toward the target molecules.

One MOS useful for the detection of formaldehyde gas is molybdenum oxide ($MoO_3$). For example, it has been reported that an organic/$MoO_3$ hybrid gas sensor has high selectivity towards the detection of formaldehyde gas. This was achieved by controlling the interlayer of organic components, such as polyaniline (PANI), poly (5,6,7,8-tetrahydro-1-naphthylamine) (PTHNA), and poly-o-anisidine (PoANIS) while using a semiconductive host layer of $MoO_3$ deposited on an electrode surface. However, the sensor configuration required a certain time for formaldehyde molecules to diffuse through the organic layer to react with the MOS, leading to a time delay in the sensor response.

There remains a need in the art for new and improved sensors for selectively detecting VOCs such as formaldehyde in the gas phase with selectivity.

SUMMARY

Provided is a sensor comprising a base transducer, a carbon support on the base transducer, a $MoO_x$-based sensing element comprising $MoO_x$ on the carbon support, where x is between 2 and 3, and a solid state electrolyte on the $MoO_x$-based sensing element.

In certain embodiments, the $MoO_x$-based sensing element comprises a combination of molybdenum(IV) oxide ($MoO_2$), molybdenum(V) oxide ($Mo_2O_5$), and molybdenum (VI) oxide ($MoO_3$). In certain embodiments, the $MoO_x$-based sensing element and the carbon support form a nanocomposite.

In certain embodiments, the carbon support comprises a highly conductive carbon. In certain embodiments, the carbon support comprises carbon black.

In certain embodiments, the solid state electrolyte comprises an ionomer, hydrophobic conductive polymer, ionic liquid, ceramic, oxide, nitride, or sulfide. In certain embodiments, the solid state electrolyte comprises a sulfonated tetrafluoroethylene-based fluoropolymer-copolymer.

In certain embodiments, the base transducer comprises a conductive metal. In certain embodiments, the base transducer comprises a working electrode, a reference electrode, and a counter electrode. In certain embodiments, the base transducer comprises a screen-printed gold electrode with a 2 mm gold working electrode, a Ag/AgCl reference electrode, and a Pt counter electrode.

In certain embodiments, $MoO_x$ is present at a concentration ranging from about 1 wt. % Mo/Carbon to about 30 wt. % Mo/Carbon. In certain embodiments, $MoO_x$ is present at a concentration of about 5 wt. % Mo/Carbon. In certain embodiments, $MoO_x$ is present at a concentration of about 10 wt. % Mo/Carbon. In certain embodiments, $MoO_x$ is present at a concentration of about 20 wt. % Mo/Carbon.

In certain embodiments, the sensor is in a hand-held, portable device.

In certain embodiments, the solid state electrolyte comprises a sulfonated tetrafluoroethylene-based fluoropolymer-copolymer, ionomer, a hydrophobic conductive polymer and/or a hydrophobic ionic liquid, the carbon support comprises carbon black, and the base transducer comprises a screen-printed gold electrode. In particular embodiments, the screen-printed gold electrode comprises a 2 mm gold working electrode, a Ag/AgCl reference electrode, and a Pt counter electrode. In particular embodiments, $MoO_x$ is present at a concentration ranging from about 1 wt. % Mo/Carbon to about 30 wt. % Mo/Carbon.

Further provided is a method of detecting formaldehyde gas, the method comprising exposing a sensor described herein to a gas phase containing formaldehyde, and measuring a change in the current of the sensor to detect formaldehyde.

In certain embodiments, the change in current is due to a reaction between formaldehyde and the $MoO_x$-based sensing element. In certain embodiments, formaldehyde is present in the gas phase at a concentration as low as about 5 ppb. In certain embodiments, other volatile organic compounds in addition to formaldehyde are present in the gas phase.

In certain embodiments, cyclic voltammetry is used to measure the current change of the sensor. In certain embodiments, electrochemical impedance spectroscopy is used to detect an impedance change and phase angle shifts due to interfacial interaction of formaldehyde with the $MoO_x$-based sensing element. In certain embodiments, formaldehyde is detected with a current change of 1.2 µA.

Further provided is a method of diagnosing lung cancer, the method comprising using a sensor described herein to analyze a subject's breath for volatile organic compounds, wherein the presence of a profile of volatile organic compounds in the subject's breath is indicative of the subject having lung cancer.

Further provided is a method of making an electrochemical sensor, the method comprising functionalizing the surface of a highly conductive carbon support to create a functionalized surface having carboxylic groups thereon; treating the functionalized surface with a solution of a molybdenum precursor, drying, and removing the precursor ligands to graft molybdenum oxide nanoclusters on the carbon support, thereby forming a nanocomposite comprising the carbon support and molybdenum oxide; depositing the nanocomposite on a base transducer comprising a working electrode, a counter electrode, and a reference electrode; and depositing a solid-state electrolyte on the nanocomposite layer to form an electrochemical sensor.

In certain embodiments, the molybdenum precursor comprises cycloheptatriene molybdenum tricarbonyl (($C_7H_8$)Mo$(CO)_3$). In certain embodiments, the molybdenum precursor is dissolved in a solvent to create a precursor solution, and the functionalized surface is contacted with the precursor solution. In certain embodiments, the functionalizing step comprises an acid treatment. In certain embodiments, the solid-state electrolyte comprises a sulfonated tetrafluoroethylene-based fluoropolymer-copolymer. In certain embodiments, the solid-state electrolyte comprises a hydrophobic conductive polymer. In certain embodiments, the solid-state electrolyte comprises an hydrophobic ionic liquid. In certain embodiments, the method further comprises allowing the solid-state electrolyte to dry. In certain embodiments, the base transducer comprises a screen-printed gold electrode.

BRIEF DESCRIPTION OF THE DRAWINGS

FIGS. 13A-13F: Electrochemical impedance spectroscopy (EIS) results and sensor resistance at 5 Hz with Nafion-10 wt. % Mo/Carbon-SPGE to:

Figure 13A:
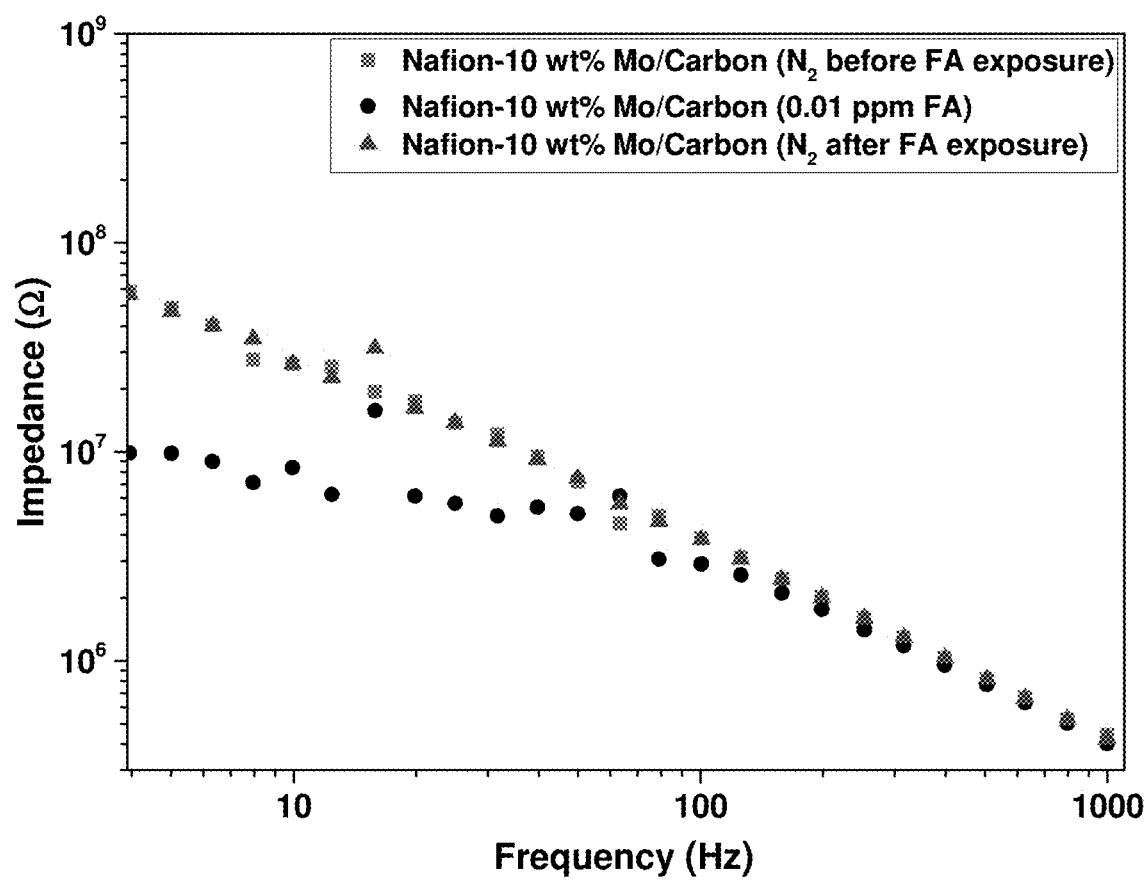
Figure 13B:
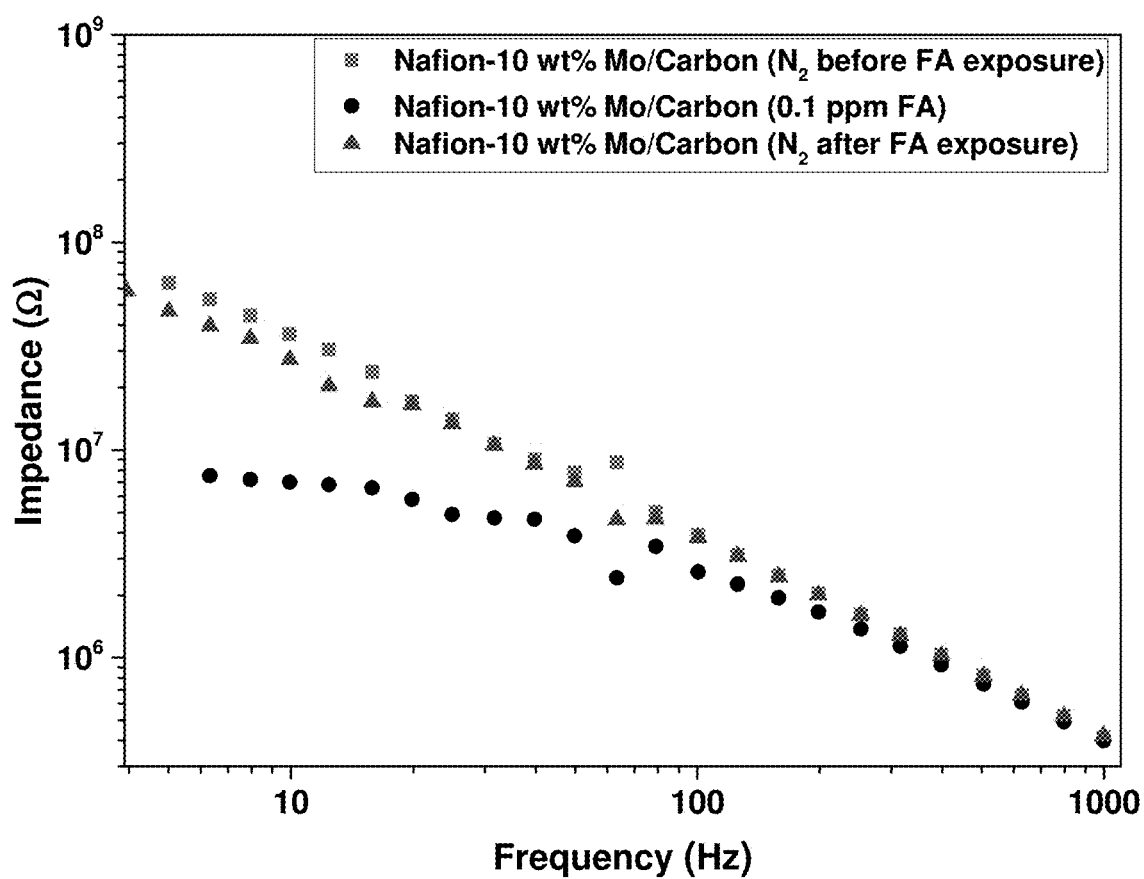

0.01 ppm (FIGS. 13A, 13D)—$N_2$ before FA exposure (blue+square dots); 0.01 ppm FA (black+round dots); $N_2$ after FA exposure (red+triangle dots). 0.1 ppm (FIGS. 13B, 13E) $N_2$ before FA exposure (blue+square dots);

0.1 ppm FA (black+round dots); $N_2$ after FA exposure (red+triangle dots).

Figure 13C:
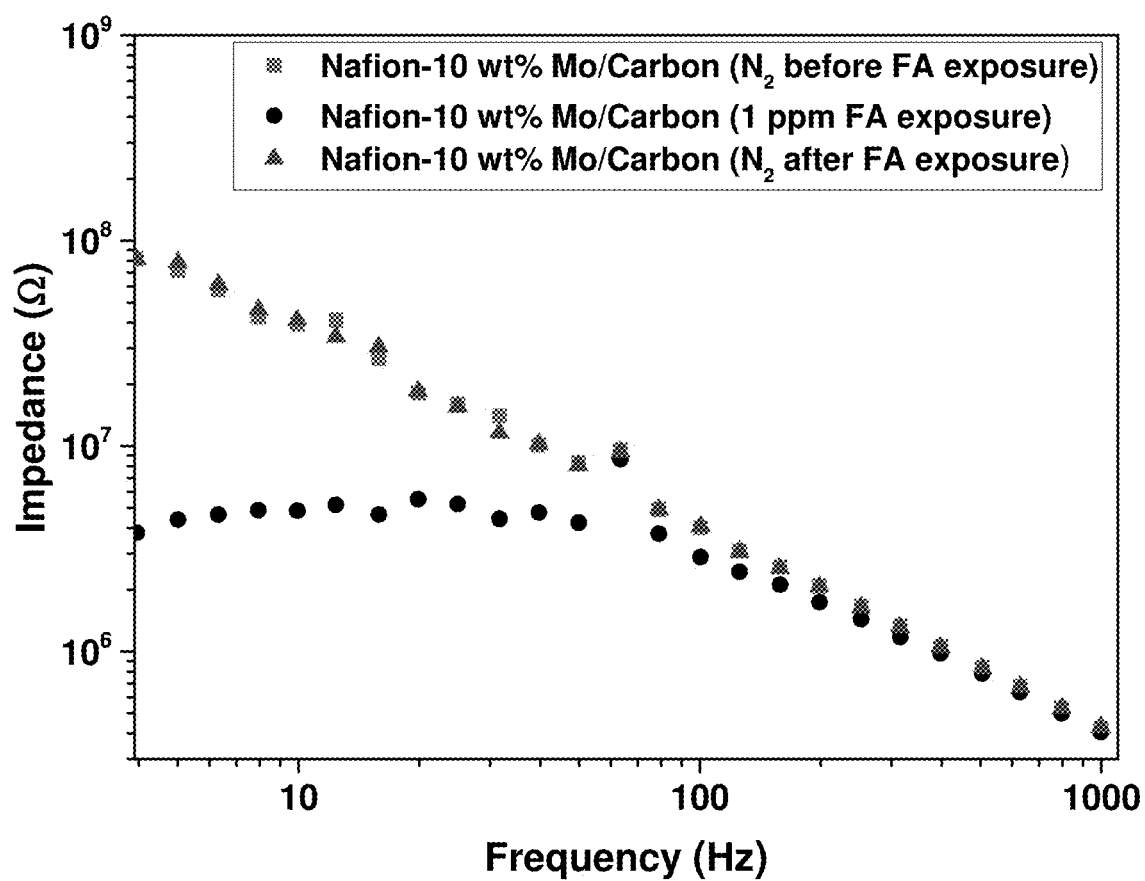

1 ppm (FIGS. 13C, 13F) of formaldehyde with $N_2$ flow before and after exposure to formaldehyde. $N_2$ before FA exposure (blue+square dots); 1 ppm FA (black+round dots); $N_2$ after FA exposure (red+triangle dots).

Figure 14:
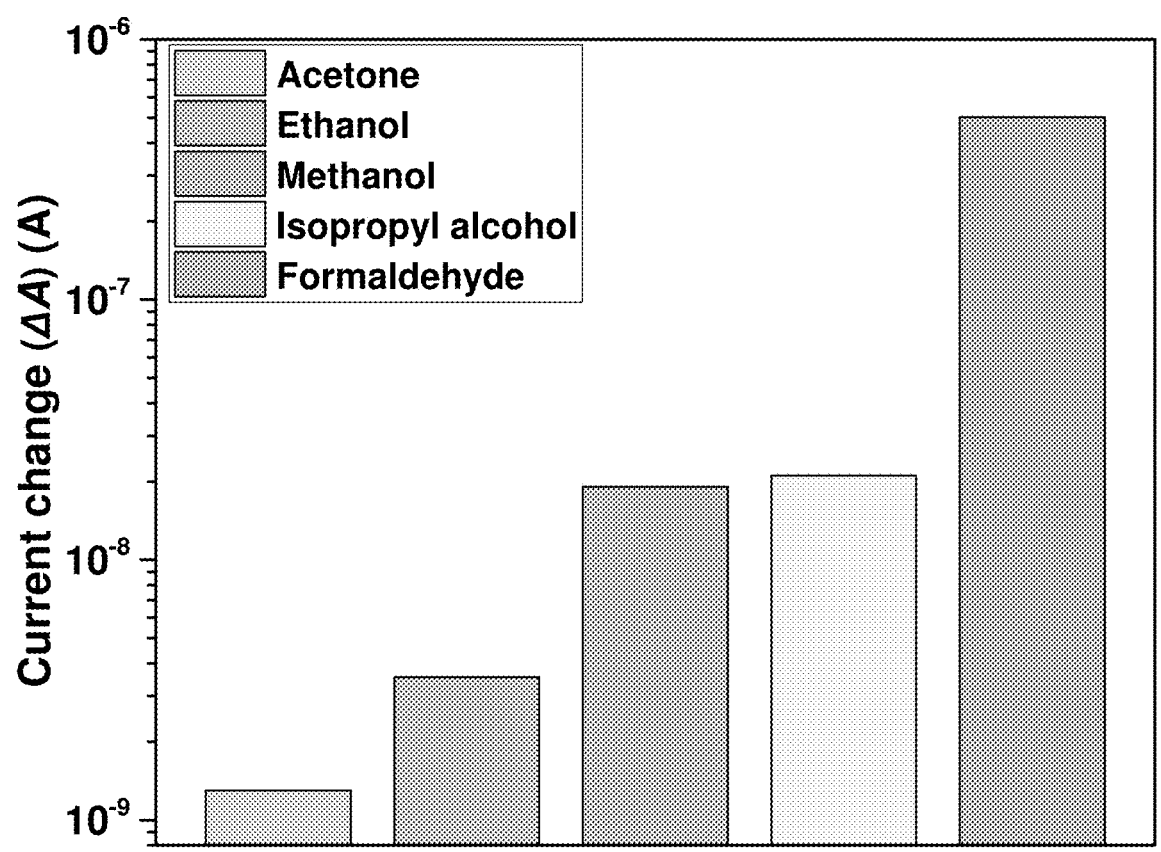

FIG. 14: Sensor response—from left to right—with Nafion-10 wt. % Mo/Carbon-SPGE towards 0.1 ppm of acetone (orange), ethanol (green), methanol (purple), isopropyl alcohol (yellow), and formaldehyde (blue).

Figure 15A:
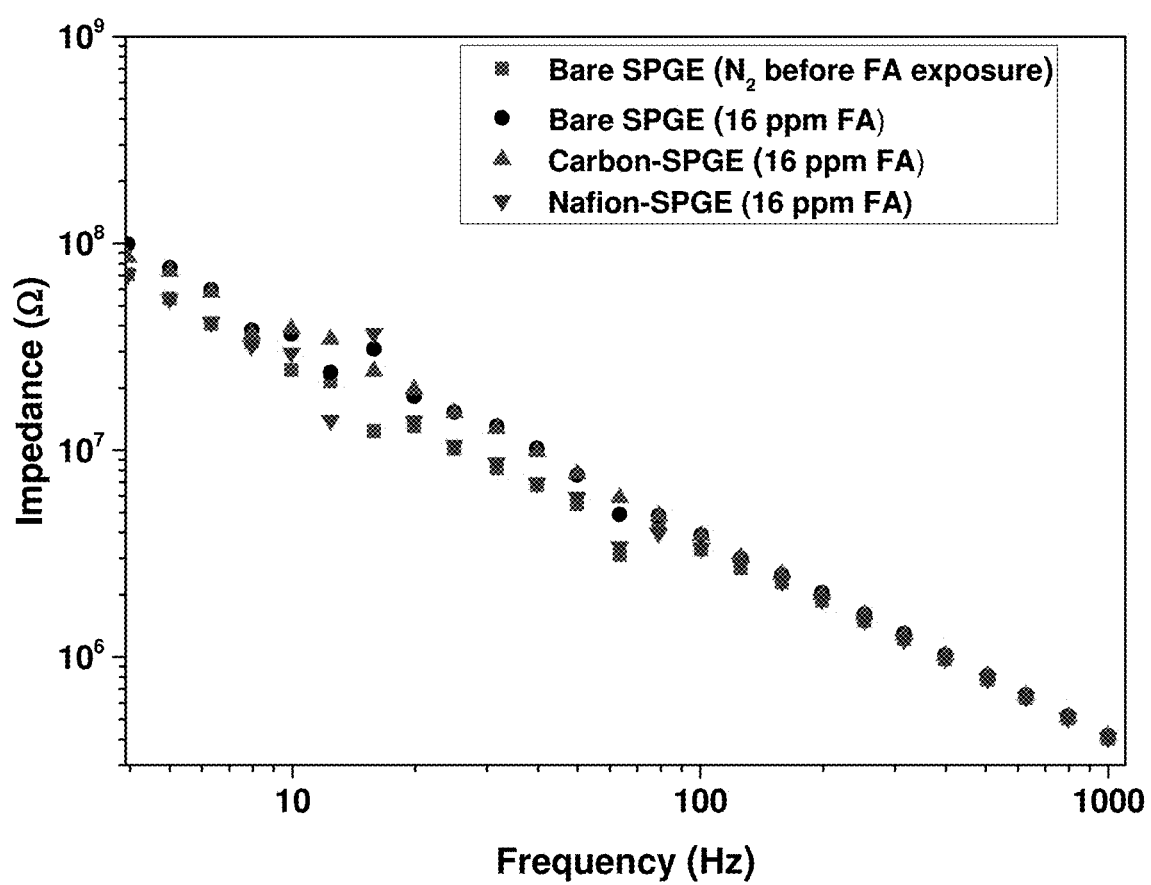
Figure 15B:
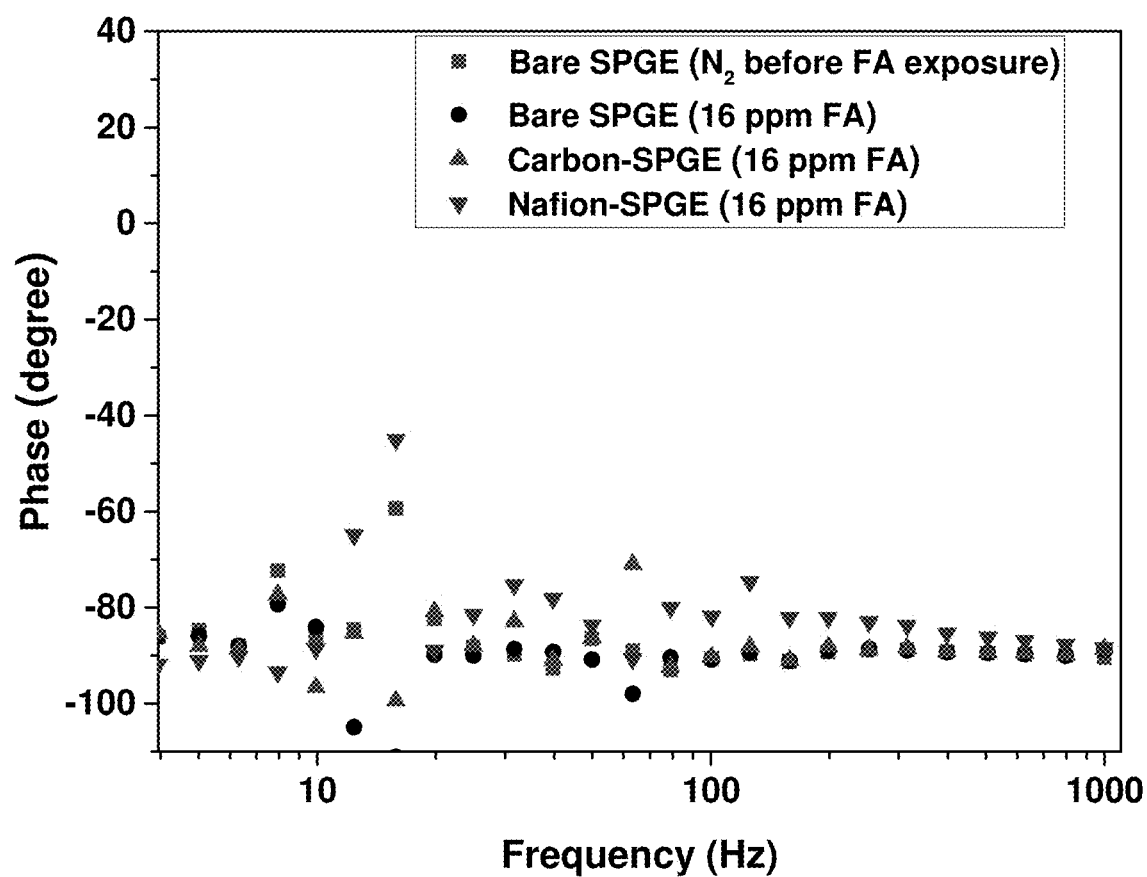

FIGS. 15A-15B: Bode plots and phase angle shift (5-1000 Hz) showing the sensor response towards nitrogen and formaldehyde gas with: bare SPGE—$N_2$ before FA exposure (red square); bare SPGE—16 ppm exposure (black circle); Carbon-SPGE 16 ppm FA—green triangle; and Nafion-SPGE (16 ppm FA purple inverted triangle).

Figure 15C:
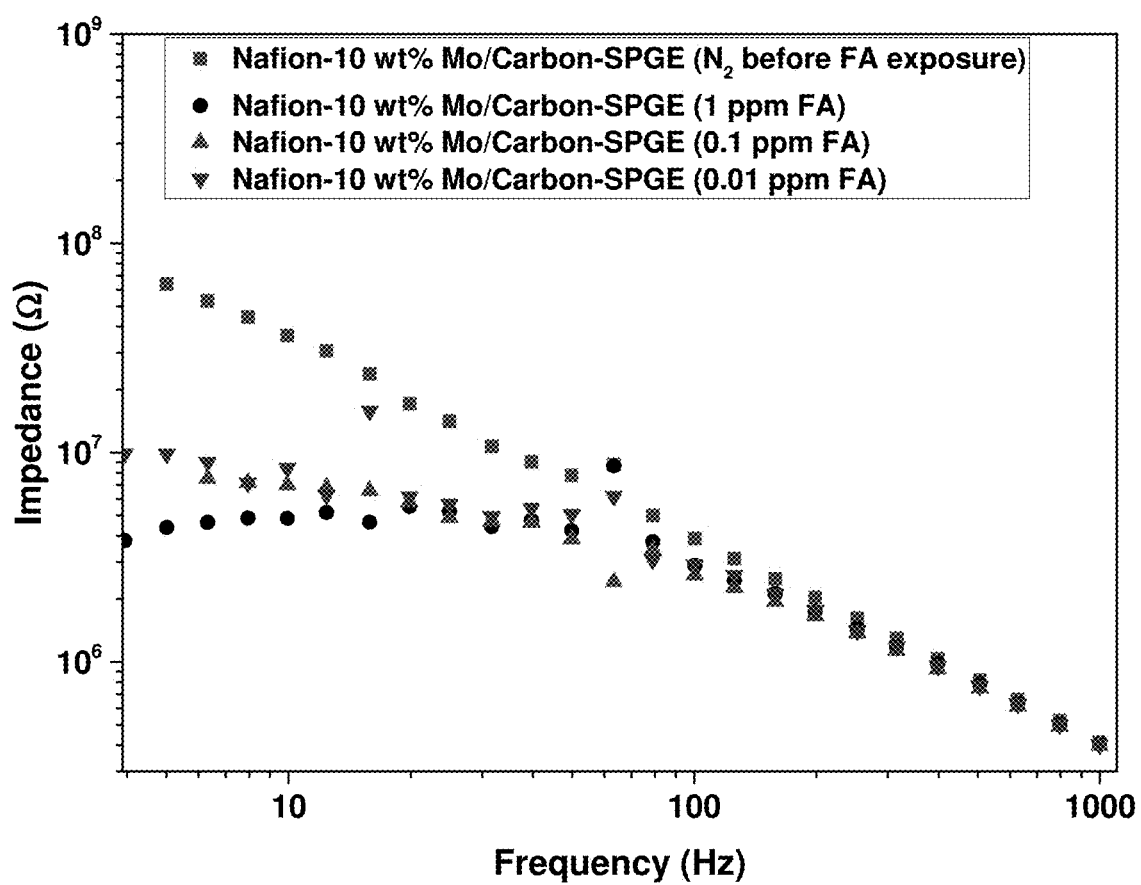
Figure 15D:
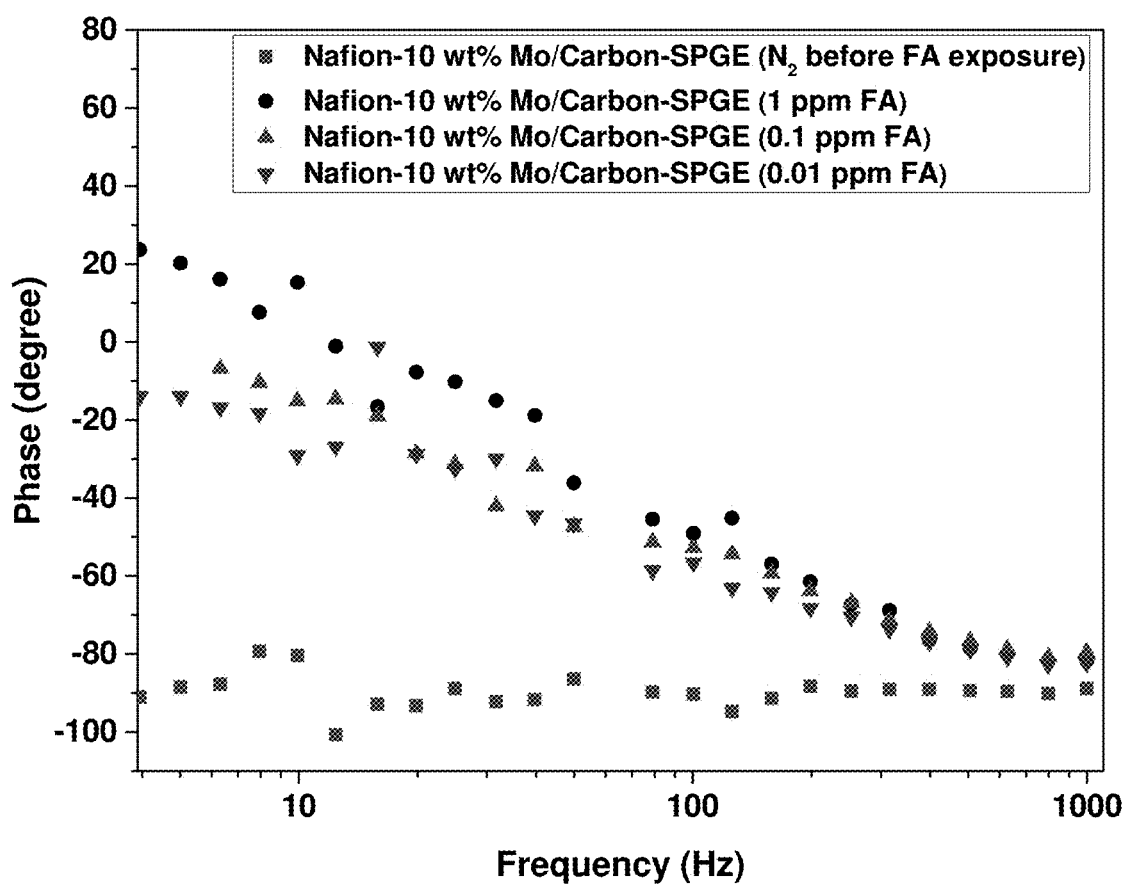

FIGS. 15C-15D: Bode plots and phase angle shift (5-1000 Hz) showing the sensor response towards nitrogen and formaldehyde gas with: Nafion-10 wt. % Mo/Carbon-SPGE: $N_2$ before FA exposure (red square); 1 ppm FA (black circle); 0.1 ppm FA (green triangle); and, 0.01 ppm FA (purple inverted triangle).

Figure 15E:
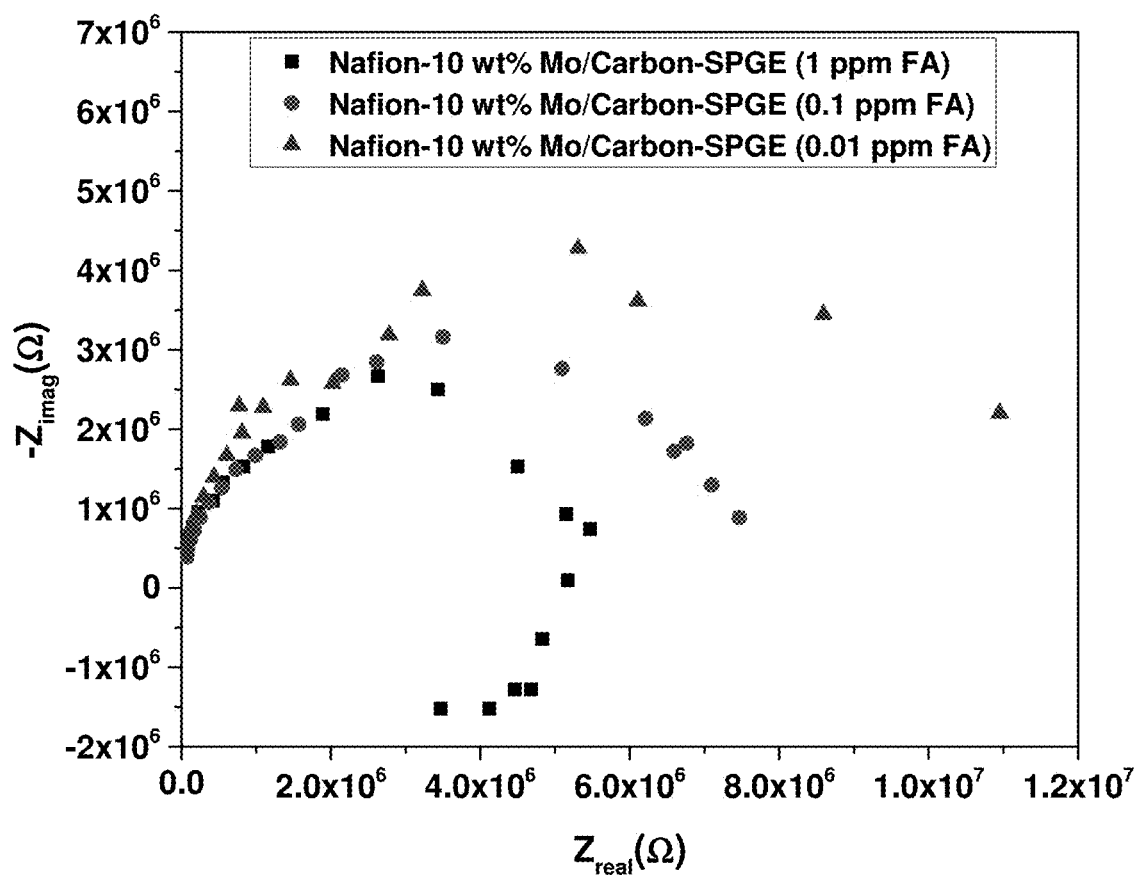

FIG. 15E shows Nyquist impedance of Nafion-10 wt. % Mo/Carbon-SPGE to 1, 0.1, and 0.01 ppm of formaldehyde gas. 1 ppm FA (black square); 0.1 ppm FA (green circle): and, 0.01 ppm FA (purple triangle).

Figure 15F:
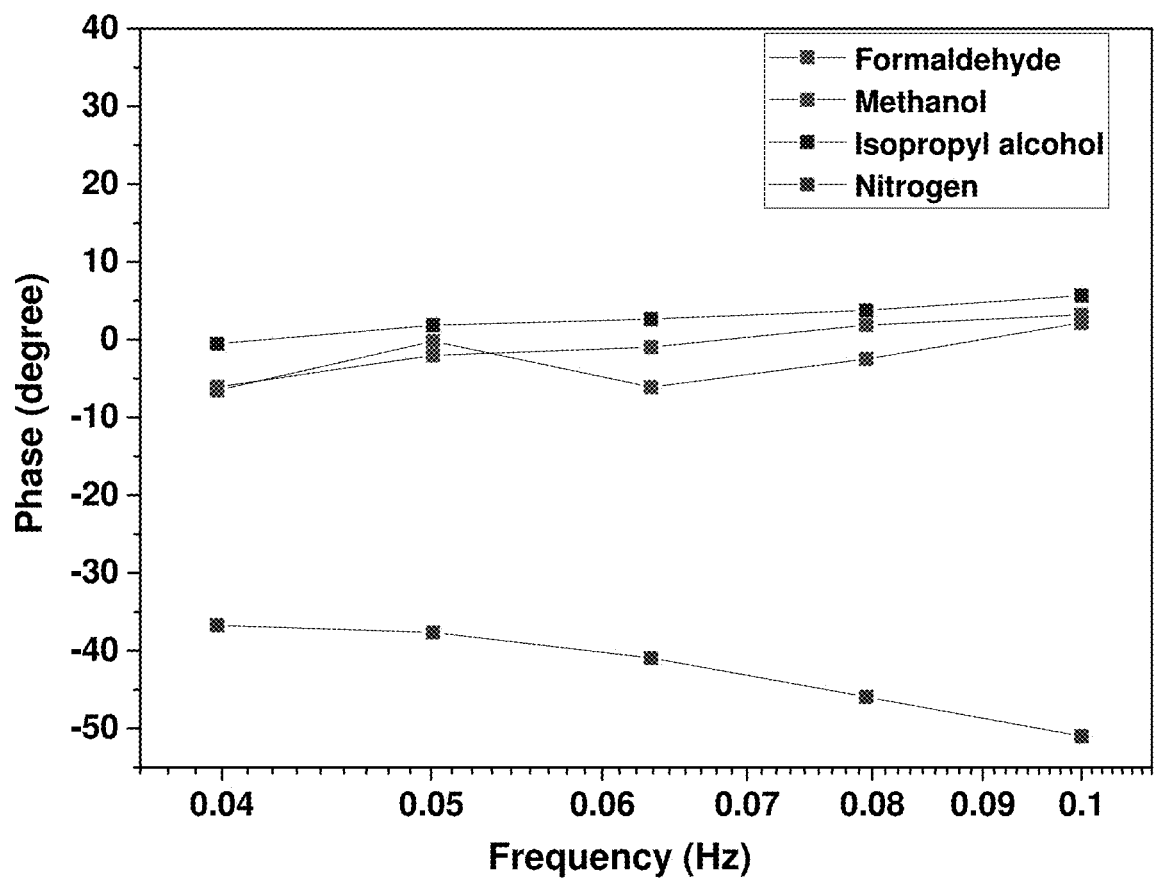

FIG. 15F shows phase angle shift (0.01-0.1 Hz) with Nafion-10 wt. % Mo/Carbon-SPGE. Formaldehyde (red square); Methanol (green square); Isopropyl alcohol (black square); and, Nitrogen (purple square).

Figure 16:
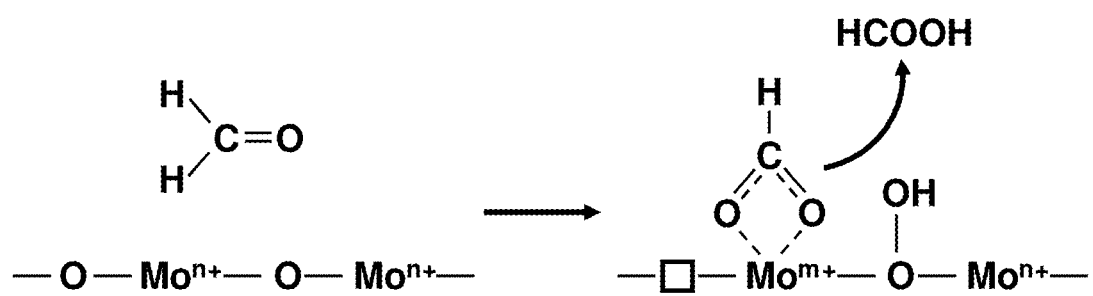

FIG. 16: Proposed mechanism for the oxidation of formaldehyde into formic acid over $MoO_x$.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

In accordance with the present disclosure, a $MoO_x$-based electrochemical sensor has been developed for the detection of formaldehyde in the gas phase at room temperature. To facilitate the conductivity of the electrochemical sensor, $MoO_x$ nanoclusters may be grafted to the oxygen-containing groups (e.g., carboxylic groups) of a highly conductive carbon. $MoO_x$ is considered an n-type semiconductor, as most of the charge carriers are electrons. The electron charge carriers may reduce the oxidized VOCs, causing a measurable decrease in the MOS conductivity.

$MoO_x$ is composed of octahedral units, each of them containing six oxygen atoms and a molybdenum atom at the center; and the formaldehyde molecule contains a carbon atom connected to oxygen through a double bond. The hydrogen bonding occurs between Mo═O in $MoO_x$, which is more electronegatively charged, and hydrogen in H—C═O of formaldehyde. The additional force of nucleophilic interaction between Mo—O— and carbon in H—C═O of formaldehyde makes $MoO_x$ more selective towards $CH_2O$. Furthermore, as $CH_2O$ has two H—C═O groups, there is less steric hindrance compared to other VOCs.

Cyclic voltammetry (CV) can be used to measure the current change (ΔA) of the $MoO_x$-based sensor due to its reaction with formaldehyde. In addition, electrochemical impedance spectroscopy (EIS) can be used to detect the impedance changes and phase angle shifts due to the interfacial interaction of formaldehyde with $MoO_x$.

Figure 1:
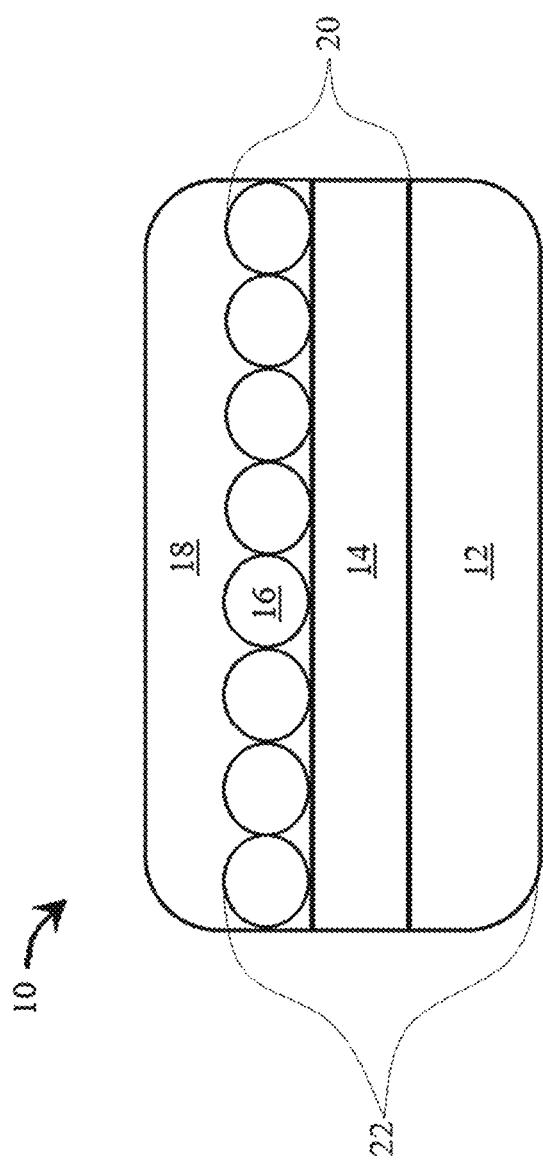
FIG. 1: Non-limiting example embodiment of a sensor in accordance with the present disclosure.

Referring now to FIG. 1, depicted is a non-limiting example embodiment of a sensor 10 in accordance with the present disclosure. The sensor 10 includes a base transducer 12, a carbon support 14 on the metal electrode, a $MoO_x$-based sensing element 16 on the carbon support 14, and an electrolyte 18 on the $MoO_x$-based sensing element 16.

The base transducer 12 may include any suitable conductive metal, such as gold, as a working electrode in addition to counter and reference electrodes. In one non-limiting example, the base transducer 12 is a screen-printed gold electrode (SPGE) with a 2 mm gold working electrode, Ag/AgCl reference electrode, and Pt counter electrode. However, many other base transducers 12 are possible, including working electrodes without one or both of the counter and reference electrodes, and such base transducers 12 are encompassed within the scope of the present disclosure.

The carbon support 14 may be composed of a highly conductive carbon, such as a carbon black. In one non-limiting example, the carbon support 14 is Vulcan XCmax22 carbon. However, many other highly conductive carbon materials are possible and encompassed within the scope of the present disclosure. Carbon is a good support for the development of catalysts, as it contributes to the dispersion of nanoparticles. Here, carbon is useful for the dispersion of ultrasmall $MoO_x$ nanoparticles to be used as the sensing element for VOCs.

The $MoO_x$-based sensing element 16 may include molybdenum oxide. Molybdenum oxide may be molybdenum(IV) oxide (i.e., $MoO_2$), molybdenum(V) oxide (i.e., $Mo_2O_5$), molybdenum(VI) oxide (i.e., $MoO_3$), or combinations thereof. $MoO_x$ nanoclusters may be formed, for example, by using surface organometallic chemistry (SOMC), in which a molybdenum precursor, such as cycloheptatriene molybdenum tricarbonyl, $(C_7H_8)Mo(CO)_3$, is grafted to the surface of the carbon support 14. The carbon support 14 may be functionalized through an acid treatment (with, for example, $HNO_3$) to create oxygen-containing groups (for example, carboxylic groups) on the surface. The molybdenum precursor, and thus the formed $MoO_x$ nanoclusters are attached to the oxygen-containing groups on the functionalized surface of the carbon support 14.

Referring still to FIG. 1, together, the $MoO_x$-based sensing element 16 and the carbon support 14 may form a nanocomposite 20. The use of a highly conductive carbon support 14 to form a nanocomposite 20 boosts the conductivity of the sensor 10. The loading of $MoO_x$ in the nanocomposite 20 may contain molybdenum in the range of from about 1 wt. % Mo/Carbon to about 30 wt. % Mo/Carbon. In non-limiting examples, the molybdenum loading as $MoO_x$ in the nanocomposite 20 is about 5 wt. % Mo/Carbon, about 10 wt. % Mo/Carbon, or about 20 wt. % Mo/Carbon.

The nanocomposite 20 may be formed first, and then deposited on the base transducer 12 through a suitable deposition process. In one non-limiting example, the nanocomposite 20 is suspended in a solution that is dropped or otherwise deposited on the base transducer 12 and then dried to form the layer stack 22. However, other methods of forming the layer stack 22 are possible and encompassed within the scope of the present disclosure. Further, it is not necessary to form the layer stack 22 in this order. Rather, the carbon support 14 may be deposited on the base transducer 12 prior to the formation of the nanocomposite 20 with $MoO_x$ nanoclusters.

The electrolyte 18 is a solid-state electrolyte and may include a hydrophobic conductive polymer, hydrophobic ionic liquid, ceramic, oxide, nitride, or sulfide. In some embodiments, the solid-state electrolyte 18 is a sulfonated tetrafluoroethylene-based fluoropolymer-copolymer, such as the composition sold under the brand name Nafion. Nafion incorporates perfluorovinyl ether groups terminated with sulfonate groups onto a tetrafluoroethylene (PTFE) backbone. Nafion possesses excellent thermal and mechanical stability, and can act as a solid-state electrolyte.

Other solid-state electrolytes are possible and encompassed within the scope of the present disclosure. In certain embodiments, the solid-state electrolyte comprises a hydrophobic conductive polymer. In certain embodiments, the solid-state electrolyte comprises a hydrophobic ionic liquid.
Examples of Hydrophobic Conductive Polymers Below are non-limiting examples of methods to make hydrophobic conductive polymers. The conductive polymers for the synthesis of the gas sensor for formaldehyde detection are polyaniline (PANI) and polypyrrole (PPy). The hydrophobity of the conductive polymer is incurred by either polymethyl methacrylate (PMMA), carbon, or silica. The procedures for the two methods are summarized as follows:

1) Nanofibers of PMMA/PANI or PMMA/Ppy (Bai et al. Composite nanofibers of conducting polymers and hydrophobic insulating polymers: Preparation and sensing applications. Polymer 50 (2009) 3292-3301).

PMMA solution (60 mg/mL) is prepared by dissolving 1.2 g PMMA in 20 mL dimethylformamide (DMF) at 50° C. Then, a controlled amount of dimethylformamide (BPO) as a liposoluble oxidant for vapor deposition polymerization of pyrrole is dissolved in the PMMA solution at room temperature to prepare a BPO/PMMA blended. The blended solutions are electrospun at room temperature under a driving voltage of 9 kV. An indium tin oxide (ITO) glass sheet (w10 U/Square) or an interdigitated platinum electrode is useful as the counter electrode and is placed 10 cm apart from the tip of the nozzle. Hydrophobic nanofibers are collected on the surface of counter electrode in the form of a non-woven mat.

The electrospun BPO/PMMA nanofibers are put into a reaction vessel containing an aqueous pyrrole solution and an aqueous hydrochloric acid solution (18 wt %, 2.5 mL). The monomer and hydrogen chloride in the reservoirs evaporated gradually and diffused into the BPO/PMMA composite nanofibers where the in situ polymerization occurs. The obtained BPO/PMMA/PPy composite nanofibers are dried in air before characterizations and application to the sensor.

2) PANI/Graphene or PANI/Conductive carbon (Parveen et al. Enhanced electrochemical behavior and hydrophobicity of crystalline polyaniline@graphene nanocomposite synthesized at elevated temperature. Composites Part B 87 (2016) 281-290)

The PANI@Carbon nanocomposite is synthesized via the in situ oxidative polymerization of aniline in the presence of carbon using potassium persulphate as an oxidizing agent. In a typical process, 0.1 g of carbon particles is added to 500 mL of 1 M HCl followed by ultrasonic agitation for proper dispersion of the carbon particles, which is followed by the addition of 5 mL of the aniline monomer. The entire system is stirred vigorously on a hot plate at a constant temperature of 60° C. A solution of the oxidant (0.5 M potassium persulphate in 500 mL 1 M HCl) is added dropwise to the above dispersion of carbon and aniline to initiate the polymerization of aniline on the carbon nanoparticles. The reaction mixture is stirred constantly for 12 h, after which the solution is filtered. The PANI@Carbon slurry after filtration is washed with an excess of water and methanol to remove the residual potassium persulphate and PANI oligomers. The nanocomposite is dedoped by 1 M ammonia solution and then washed sequentially with water and methanol.

The prepared emeraldine base of the PANI@Carbon nanocomposite is doped with 100 mL of a 1 M HCl solution for 12 h, filtered and washed with water and methanol. Carbon nanoparticles can be graphene or Vulcan®.
Examples of Ionic Liquids (ILs)

Ionic liquids can be used as a supporting electrolyte for gas sensing. One non-limiting example is glycerol. Other examples of ILs are hexafluorophosphate, tetrafluoroborate salts, and bistriflimides $[(CF_3SO_2)_2N]^-$. These ILs are hydrophilic. In order to create a hydrophobic electrolyte layer for the molybdenum oxide/carbon ($MoO_x$/Ca) nanocomposite sensor for formaldehyde detection in gas phase, the present invention uses hydrophobic ionic liquids including trioctyl (methyl)ammonium dicyanamide, trihexyl (tetradecyl)phosphonium dicyanamide, and trihexyl (tetradecyl) phosphonium bis(trifluoromethylsulfonyl)imide.

These ILs can be directly applied to the surface of the $MoO_x$/Ca nanocomposite as an electrolyte layer for sensing independent of humidity of gas phase.

The electrolyte 18 may simply be added on top of the layer stack 22 and dried to form the sensor 10. However, other methods of fabricating the sensor are possible and entirely encompassed within the scope of the present disclosure.

The sensor 10 is based on an n-type MOS. Due to its unique deposition of nano-scale metal oxide on a high conductive carbon, the nanocomposite 20 interacts with formaldehyde selectively. Whereas conventional sensors operate above 100° C., the sensor 10 can operate at room temperature. Furthermore, the sensor 10 may have excellent sensitivity, being able to detect formaldehyde is a gas phase at a concentration as low as about 5 ppb. In some embodiments, the sensor 10 can detect formaldehyde (0.1 ppm) with a current change of 0.503 µA, which is greater than that of 0.0211, 0.0191, 0.00354, and 0.0013 with 0.1 ppm isopropyl alcohol, methanol, ethanol, and acetone, respectively.

The sensor 10 may be embodied in various forms, adapted for the particular environment or intended use. As a non-limiting example, the sensor 10 may be embodied in a hand-held, portable device. However, the apparatus housing the sensor 10 is not particularly limited.

As a non-limiting example of a useful application for the sensor 10, the sensor 10 may be utilized in the detection of formaldehyde in the breath of a subject, as a diagnostic for lung cancer. Lung cancer tumors produce volatile organic compounds, which evaporate into the air and produce a discernable scent profile. The sensor 10 may therefore be used to diagnose lung cancer by detecting volatile organic compounds in the breath of a subject, such as a human subject.

Examples

Electrochemical $MoO_x$/Carbon Nanocomposite Gas Sensor for Formaldehyde Detection at Room Temperature A nanocomposite composed of molybdenum oxide and highly conductive carbon ($MoO_x$/Carbon), deposited onto a screen-printed gold electrode (SPGE), was employed as a gas sensor for the detection of formaldehyde gas. First, the carbon surface was modified by acid treatment to introduce oxygen-containing groups, which promoted the efficient anchorage of $MoO_x$ to the carbon surface by using surface organometallic chemistry (SOMC). Then, once the composite was deposited onto the SPGE, a Nafion layer was added to act as a solid-state ionic electrolyte. Fourier-transform infrared (FTIR) spectroscopy and thermogravimetric analysis (TGA) were used to verify the carboxylated surface of carbon after the acid treatment. Scanning transmission electron microscopy (STEM) and inductively coupled plasma optical emission spectrometry (ICP-OES) were also employed to confirm the success of the SOMC synthesis. Cyclic voltammetry (CV) and electrochemical impedance spectroscopy (EIS) were used to investigate the interaction of the nanocomposite with formaldehyde at room temperature. The nanocomposite gas sensor demonstrated a greater sensor response to electrical current changes upon increasing concentration of formaldehyde. Among the different concentrations of formaldehyde tested, the composite sensor showed the greatest response of 1.20 µA with 1 ppm FA.

In this example, a molybdenum oxide ($MoO_x$)-based electrochemical sensor for the detection of formaldehyde in the gas phase was evaluated. To boost the conductivity of the electrochemical sensor, $MoO_x$ nanoclusters were grafted to the oxygen-containing groups (i.e., carboxylic groups) of a highly conductive carbon. Cyclic voltammetry (CV) was used to measure the current change (ΔA) of the $MoO_x$/Carbon composite due to its reaction with formaldehyde gas. In addition, electrochemical impedance spectroscopy (EIS) was used to gain a better understanding of the interfacial interaction of formaldehyde gas with $MoO_x$.

Materials and Methods

Materials

All the chemicals were obtained from Sigma-Aldrich, USA, except for cycloheptatriene molybdenum tricarbonyl (($C_7H_8$)Mo(CO)$_3$) (Strem Chemicals, USA) and Vulcan XCmax22 (Cabot, USA). Cycloheptatriene molybdenum tricarbonyl, n-pentane, and Vulcan XCmax22 were used to synthesize the $MoO_x$/Carbon nanocomposites. Nitric acid (ACS reagent, 90%) was used to functionalize Vulcan XCmax22, which is a highly conductive carbon. A commercial formaldehyde solution (ACS reagent, 37 wt. % in $H_2O$ containing 10-15 wt. % of methanol), ethyl alcohol (anhydrous, 200 proof, 99.5%), methanol (ACS reagent, 99.9%), acetone (ACS reagent, 99.5%), and 2-propanol (anhydrous, 99.5%) were used for investigating the sensor selectivity. Screen-printed electrodes (SPGE, Pine Instruments, USA) with a 2 mm gold working electrode, Ag/AgCl reference electrode, and Pt counter electrode were used as the sensor base transducer. SPGE was pretreated in a mild piranha solution containing 1:3 (v/v) hydrogen peroxide solution (30 wt. %) and sulfuric acid (99.99%) for 10 min. A Nafion 117 containing solution (~5% in a mixture of lower aliphatic alcohols and water) was used as a solid-state ionic electrolyte. Molybdenum (VI) oxide (99.7% trace metals basis) was also used for preparing a physical mixture with Vulcan XCmax22 carbon. A Gamry Reference 600 potentiostat (Gamry Instruments, USA) was used to perform cyclic voltammetry (CV) and electrochemical impedance spectroscopy (EIS). A EuroCell™ Standard glass cell (Gamry Instruments, USA) was used as the test chamber for the detection experiments. An Elitech GSP-6 probe (Elitechustore, USA) was used to monitor the temperature and humidity inside the chamber. Industrial-grade nitrogen (Airgas, USA) was used to provide the baseline of the CV and EIS measurement, as well as the carrier gas. Additionally, argon (Airgas, USA) was used to regulate the humidity inside the gas chamber, as this allows for control of humidity fluctuations.

Sample Preparation

Functionalization of the Carbon Support

Highly conductive Vulcan XCmax22 carbon was functionalized with a $HNO_3$ solution to create oxygen-containing groups on its surface (i.e., carboxylic groups). These groups act as anchoring points for grafting of the molybdenum precursor, cycloheptatriene molybdenum tricarbonyl, ($C_7H_8$)Mo(CO)$_3$, to the carbon surface. For the acid treatment, 10 g of carbon was added into a round-bottom flask, which was placed inside a silicon oil bath at 105° C. After adding 175 mL of 5 M $HNO_3$ solution to the flask, this was immediately connected to a distillation column refrigerated at −10° C. to perform the acid treatment under reflux. After stirring for 4 h, the acid-treated carbon was filtered and washed with DI water several times until neutral pH. Finally, the acid-treated carbon was dried overnight in an oven at 60° C. and stored at room temperature.

Synthesis of the $MoO_x$/Carbon Nanocomposites

Figure 2:
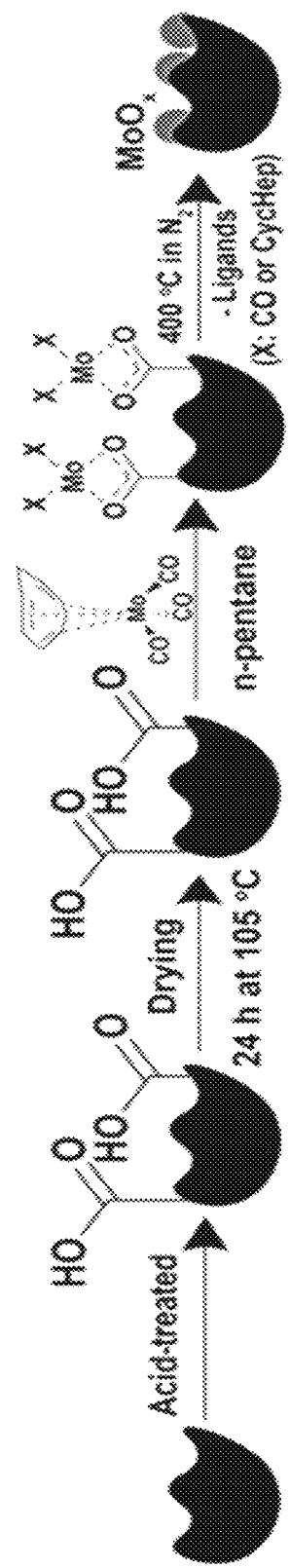
FIG. 2: Representation of the synthesis of $MoO_x$/Carbon nanocomposites by using surface organometallic chemistry (SOMC).

The acid-treated carbon (1 g) was placed in a Schlenk tube, which was immersed in a silicon oil bath at 105° C. The Schlenk tube was then connected to a Schlenk line for 24 h to remove moisture. After drying, the Schlenk tube was filled with argon and brought inside a glove box filled with UHP argon for synthesizing the $MoO_x$/Carbon nanocomposite by surface organometallic chemistry (SOMC), as shown in FIG. 2. The amount of molybdenum precursor was varied to synthesize different theoretical loadings, being this of 0.149, 0.315, and 0.710 g for the synthesis of 5, 10, and 20 wt. % Mo (as $MoO_x$)/Carbon, respectively. The desired amount of molybdenum precursor was dissolved in 15 mL of n-pentane and stirred for 30 min. After that, the precursor solution was added into the Schlenk tube containing 1 g of acid-treated carbon. After 12 h of stirring for efficient anchorage of the molybdenum precursor to the carboxylic groups, the Schlenk tube was sealed and connected to the Schlenk line to dry n-pentane out. Once dried, the Schlenk tube was connected to a gas line under 10 mL/min nitrogen. Then, the tube was place inside a tubular oven and the temperature was increased until 400° C. at 5° C./min. The sample was held at 400° C. for 2 h before cooling down to room temperature under flow of nitrogen. This step contributes to the removal of the precursor ligands to obtain MoO$_x$ on the surface of the carbon support. The sample (MoO$_x$/Carbon nanocomposite) was then collected and stored in a desiccator at room temperature.

Deposition of MoO$_x$/Carbon Nanocomposite onto the Electrode for the Detection of Formaldehyde Screen-printed gold electrodes (SPGE) were cleansed with 0.1 M of H$_2$SO$_4$ solution using CV in the potential range from −0.8 to 0.8 V with scan rate of 100 mV/s. After that, 0.05 g of MoO$_x$/Carbon nanocomposite was suspended in 2.5 mL of DI water. The solution was then sonicated for 1 h and deposited onto the working electrode of the SPGE by delivering a single drop (2.5 µL) using a micropipette. The droplet was then dried in an oven at 60° C. for 20 min. Two additional single droplets with intermediate drying were added to generate the MoO$_x$/Carbon nanocomposite layer on the SPGE. After that, 2.5 µL of Nafion was added on top of the MoO$_x$/Carbon nanocomposite and dried in air for 20 min. The SPGE modified with a layer of MoO$_x$/Carbon and a second layer of Nafion (Nafion-MoO$_x$/Carbon-SPGE) was used as the electrochemical sensor for the detection of formaldehyde gas by CV and EIS.

Chamber Testing

Figure 3:
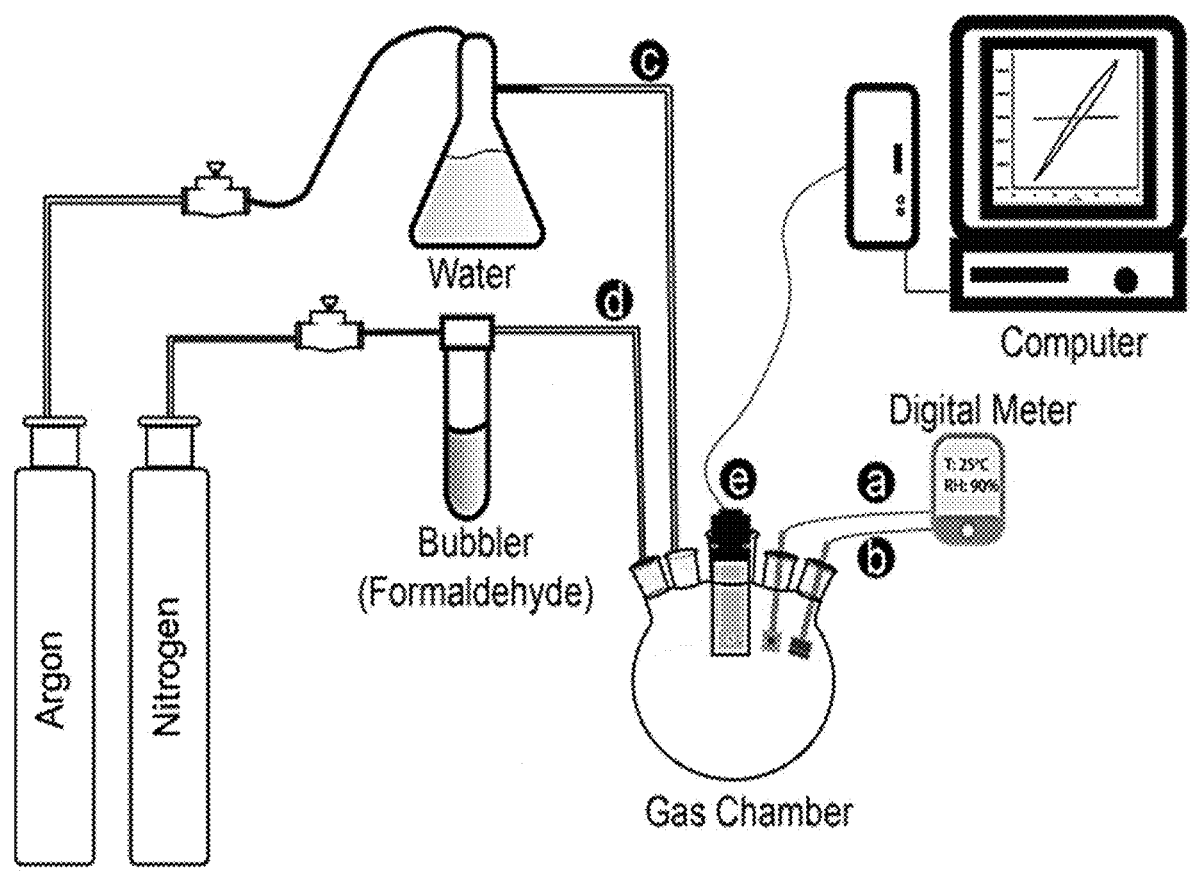
FIG. 3: Schematic diagram of the experimental setup for the examples herein.
Figure 4:
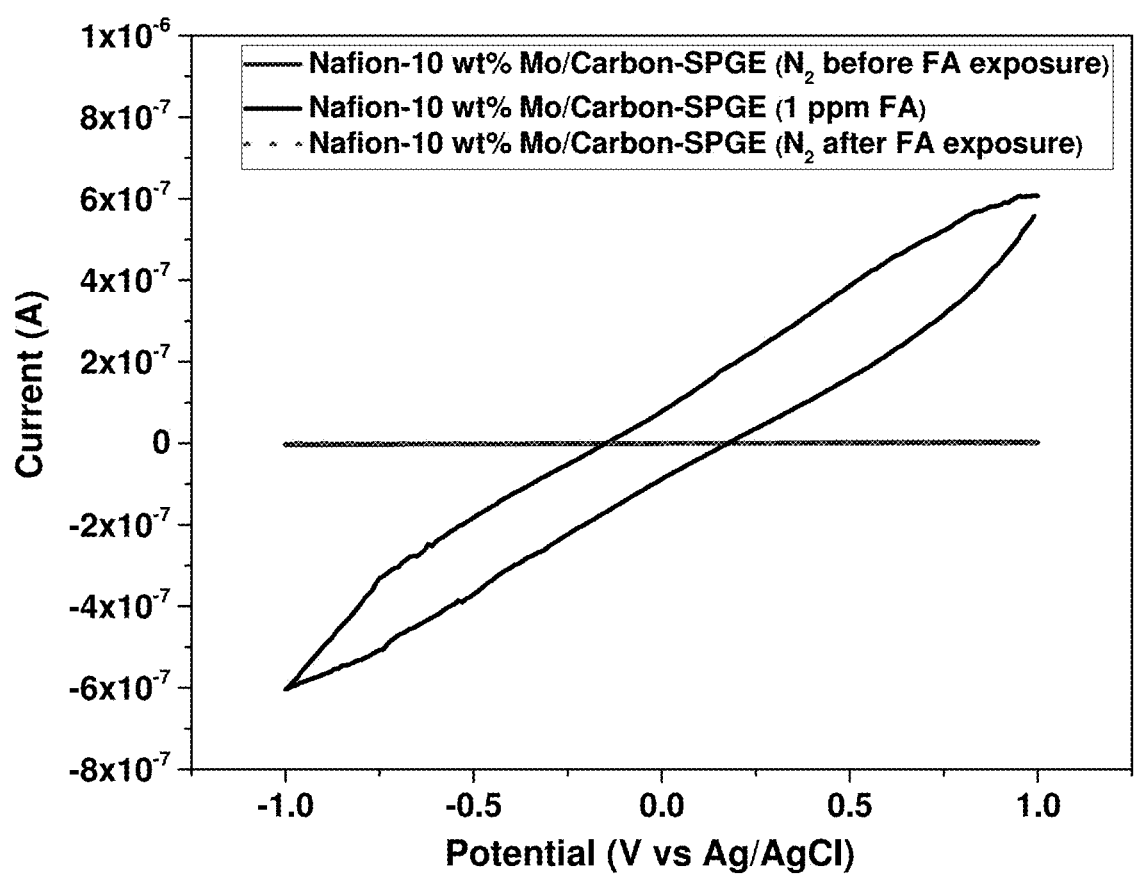
FIG. 4: Calculating the current change (ΔA) with Nafion-10 wt. % Mo/Carbon-SPGE when exposed to formaldehyde gas. $N_2$ before FA exposure (blue line); 1 ppm FA (black line); $N_2$ after FA exposure (dotted red line).

The setup for the detection of formaldehyde gas in this example is shown in FIG. 3. Thermocouple and humidity probe were connected to a 270 mL glass chamber, as shown in FIG. 3, points A and B, to control the temperature and humidity during the experiment. Then, moist argon gas was flowed into the chamber via the gas tube shown in FIG. 3, point C, to control the humidity by controlling the flow rate of argon gas. Argon allows for an excellent control of the humidity without fluctuations. Through the fourth neck, nitrogen and formaldehyde gases were flowed into the chamber using a gas tube as demonstrated in FIG. 3, point D. The concentration of formaldehyde was controlled by dilution of the solution with DI water before flowing it into the chamber. Argon gas and nitrogen gases were flowed into the chamber unit under the desired humidity. The Nafion-MoO$_x$/Carbon-SPGE, which was connected to a Gamry Reference 600 potentiostat, was inserted into the chamber as shown in FIG. 3, point E, for the detection of formaldehyde gas and other VOCs. Before running the experiments, the conditions in the chamber were set at 90±3% relative humidity (RH) with 25±1° C. To do so, 10 mL/min of nitrogen was flowed into the chamber first. Then, the first CV and EIS experiments were run to investigate the response of the Nafion-MoO$_x$/Carbon-SPGE to nitrogen gas. These results were used as the baseline for the calculation of the sensor response to formaldehyde gas. After this, the desired concentration of formaldehyde gas was flowed into the chamber and the second CV and EIS were recorded to monitor the response of Nafion-MoO$_x$/Carbon-SPGE to formaldehyde gas. Finally, nitrogen gas was flowed again to purge formaldehyde gas out of the chamber, and the third CV and EIS experiments were recorded to confirm the response of Nafion-MoO$_x$/Carbon-SPGE to nitrogen gas and thus, study the reversibility of the measurements. CV experiments were recorded in a range of −1.0 to 1.0 V with 50 mV/s scan rate because these parameters provided consistent current signals. CV was used to calculate the current change (ΔA) due to the electrochemical reaction between the composite sensor and formaldehyde gas. The ΔA was calculated using the procedure depicted in FIG. 4, in which ΔA is taken from the difference between the currents at −1.0 and 1.0 V. On the other hand, EIS measurements were recorded in the range of 5 to 1000 Hz and 0.1 to 0.01 Hz with AC and DC voltages of 40 and 0.001 mV, respectively.

Characterization of the MoO$_x$/Carbon Nanocomposites

An FTS-4000 Varian Excalibur Series Fourier-transform infrared (FTIR) spectrometer was used to confirm the functionalization of the carbon surface upon acid treatment and the anchorage of the MoO$_x$ moieties. To do so, 1.2 mg of dried sample was blended with 500 mg of dried KBr. Then, 5 mg of the blended sample was pressed using a pellet die kit to make a thin pellet. FTIR spectra were recorded in the range of 450-4000 cm$^{-1}$. A TA Instruments Q50 thermogravimetric analysis (TGA) equipment was used to determine the required temperature for removal of the ligands of the organometallic precursor and to confirm the success of the acid treatment and the anchorage of the MoO$_x$ moieties to the carbon surface. For TGA, 7 mg of sample was loaded into an aluminum plate and the temperature was ramped (10° C./min) from 25 to 1100° C. under 50 mL/min of nitrogen. Additionally, inductively coupled plasma-optical emission spectrometry (ICP-OES) analyses were conducted to determine the actual Mo loading (in the form of MoO$_x$) on carbon. These analyses were performed by Galbraith Laboratories, Inc. using a PerkinElmer Optima 5300V ICP-OES. Prior to analysis, the samples were fused with sodium peroxide over a Bunsen burner and dissolved in water before being acidified. Scanning transmission electron microscopy (STEM) was also used to determine the distribution of MoO$_x$ onto the carbon surface. These analyses were performed at the Center for Electron Microscopy and Analysis (CEMAS) at The Ohio State University. For the preparation of the STEM specimens, the nanocomposite powders were dispersed in ethanol, sonicated for 10 min, and then deposited onto 300-mesh copper TEM grids coated with lacey carbon films. High-angle annular dark-field (HAADF) STEM images were carried out using a FEI Titan G2$^{3TM}$ 60-300 S/TEM with collection angle of 106-200 mrad to ensure proper Z-contrast, and low probe current and fast acquisition were utilized to minimize the electron beam effect to preserve the pristine structures.

Results and Discussion

Synthesis and Characterization of MoO$_x$/Carbon Nanocomposites

Figure 5:
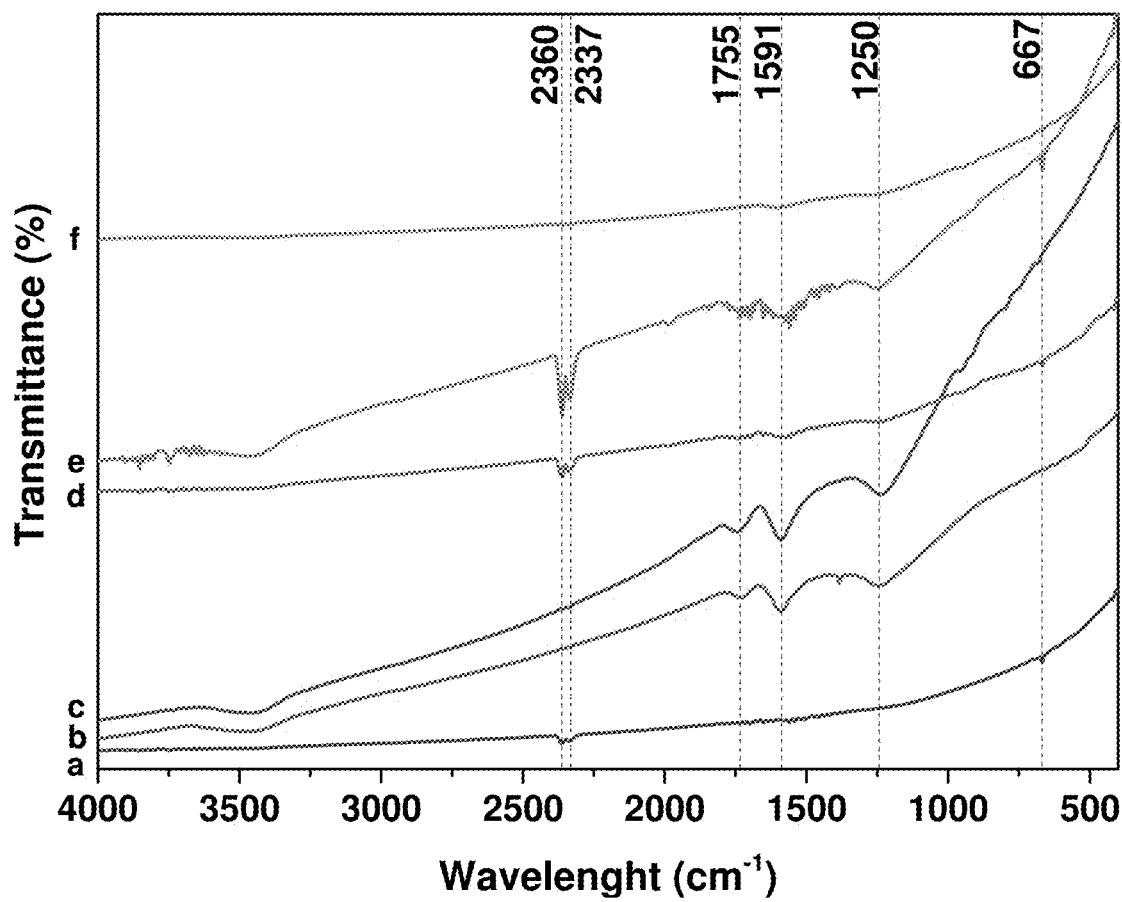
FIG. 5: FTIR spectra of Vulcan XCmax22 carbon (line a), acid-treated Vulcan XCmax22 carbon (line b), 5 wt. % (line c), 10 wt. % (line d), 20 wt. % (line e) Mo/Carbon before thermal treatment, and 20 wt. % Mo/Carbon after thermal treatment (line f).

Nanocomposites with three different Mo loadings were synthesized by using surface organometallic chemistry (SOMC): 5, 10, and 20 wt. % Mo/Carbon. As previously stated, the highly conductive carbon was first functionalized to create anchorage points for grafting of the molybdenum precursor. Successful functionalization of carbon was demonstrated by FTIR (FIG. 5). FIG. 5, line a, shows the spectrum obtained with pristine Vulcan XCmax22 carbon, where the absorption band at 671 cm-1 is assigned to the —CH out-of-plane vibrations. After acid treatment (FIG. 7, line b), the FTIR spectrum shows additional absorption bands, which represent the oxidized surface of carbon. The additional bands at 1250 cm$^{-1}$ and 3200-3600 cm$^{-1}$ represent the —OH in-plane bending and stretching vibrations, respectively. Moreover, the absorption bands at 1591 cm$^{-1}$ can be attributed to the C=C stretching vibration. Interestingly, the oxidized carbon also shows a strong band at 1723 cm$^{-1}$, which is associated with the C=O stretching vibration of carboxyl groups, indicating the successful functionalization of carbon upon acid treatment. When adding 5 wt. % Mo to the acid-treated carbon (FIG. 5, line c), the FTIR spectrum hardly changed, likely due to the low loading of Mo precursor. When 10 and 20 wt. % Mo were added to carbon, most of the bands associated to the carboxyl groups were reduced because of the grafting of the molybdenum precursor; however, two new bands appeared at 2337 and 2360 cm$^{-1}$, which can be assigned to the —CO ligands of the molybdenum organometallic precursor. Unlike in the synthesis of the 5 wt. % Mo/Carbon nanocomposite, in which the solution of the precursor became clear after 12 h, during the synthesis of the 10 and 20 wt. % Mo/Carbon samples, the solution still showed a bright orange and red-orange color, respectively, after 12 h, which indicated incomplete uptake of the molybdenum precursor by carbon. This confirms an excess of precursor with respect to the number of carboxylic groups available for anchorage. Therefore, upon solvent removal, the organometallic molybdenum precursor stays physically absorbed on carbon without proper anchorage to the surface of carbon. As it can be seen in FIGS. 5, lines d and e, the bands associated with the ligands of the precursor are more intense in the sample with 20 wt. % Mo loading due to a higher amount of precursor on the surface. However, after thermal treatment, the intensity of those bands decreases considerably due to the pyrolysis of those groups that were not effectively anchored, as it can be seen in FIG. 5, line f. These results are in agreement with those obtained by TGA.

Figure 6:
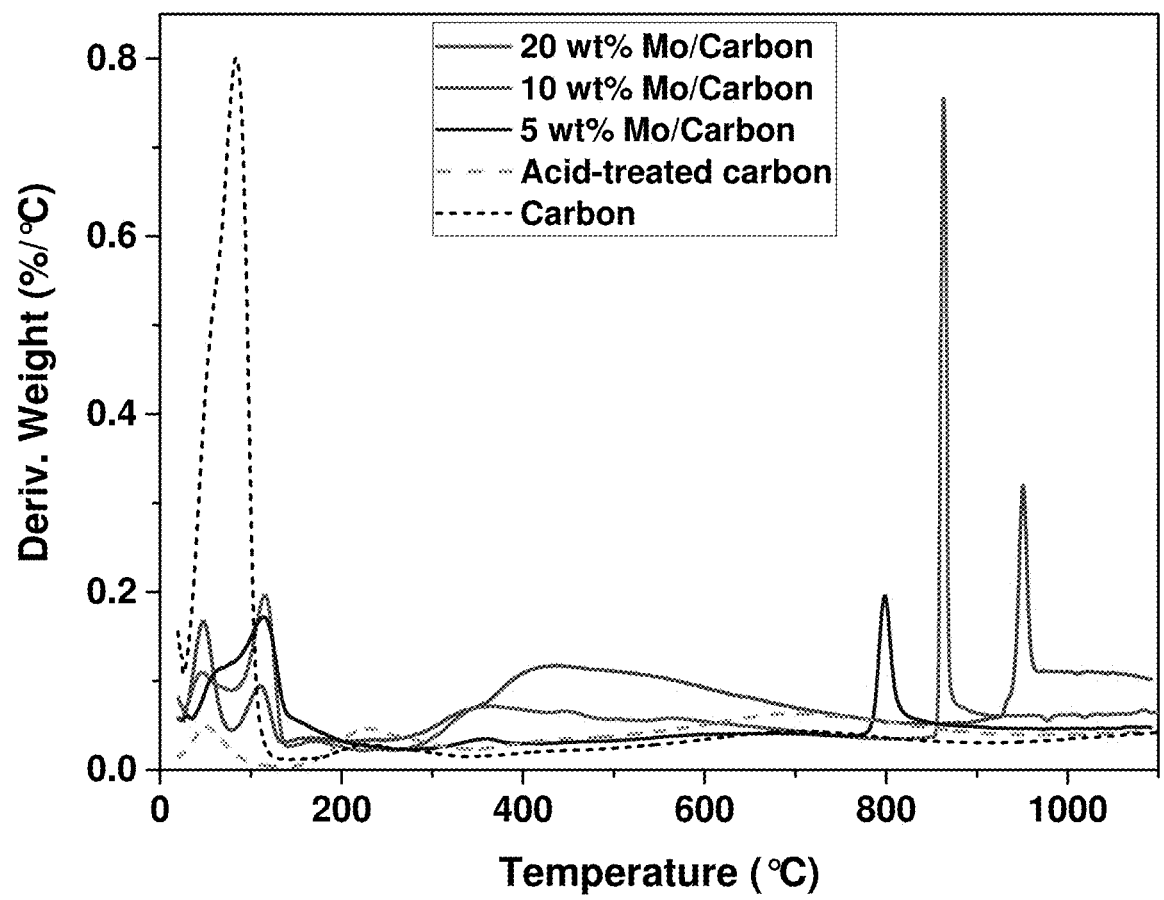
FIG. 6: Thermogravimetric analyses of carbon (dotted black line), acid-treated carbon (dashed red line), 5 wt. % (black line), 10 wt. % (blue line), and 20 wt. % (red line) Mo/Carbon for ligands removal.
Figure 7A:
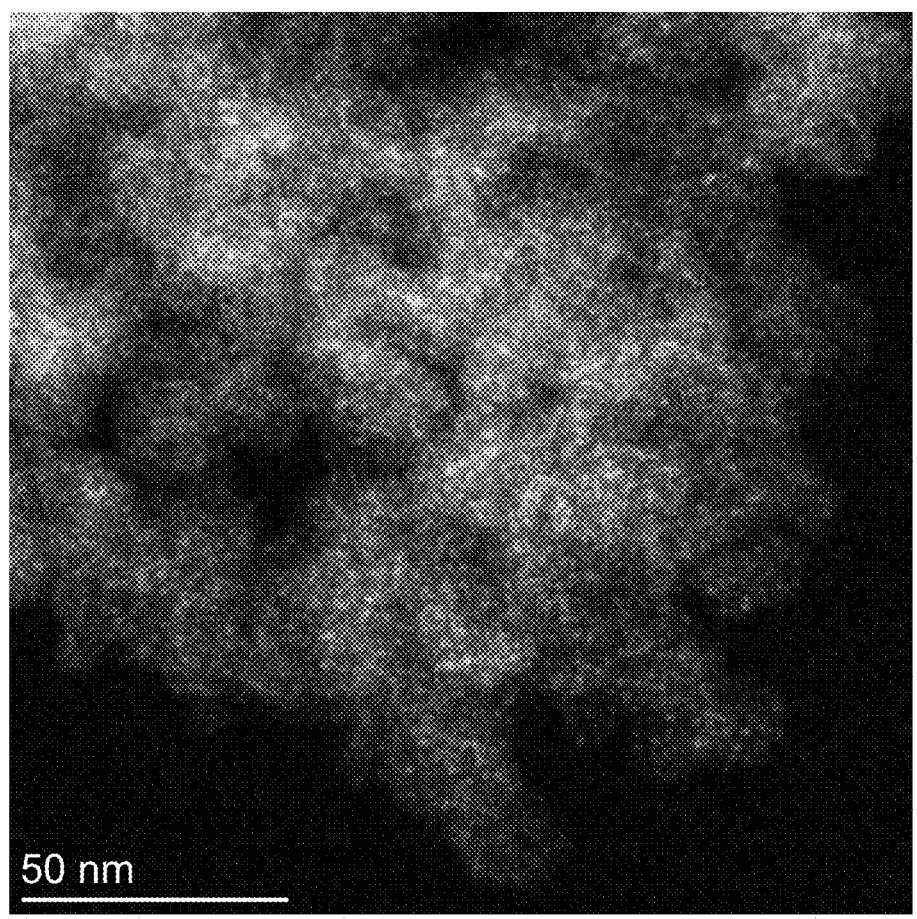
FIGS. 7A-7F: STEM images of 10 wt. % (FIGS. 7A, 7B, 7C) and 20 wt. % (FIGS. 7D, 7E, 7F) Mo/Carbon nanocomposites.
Figure 7B:
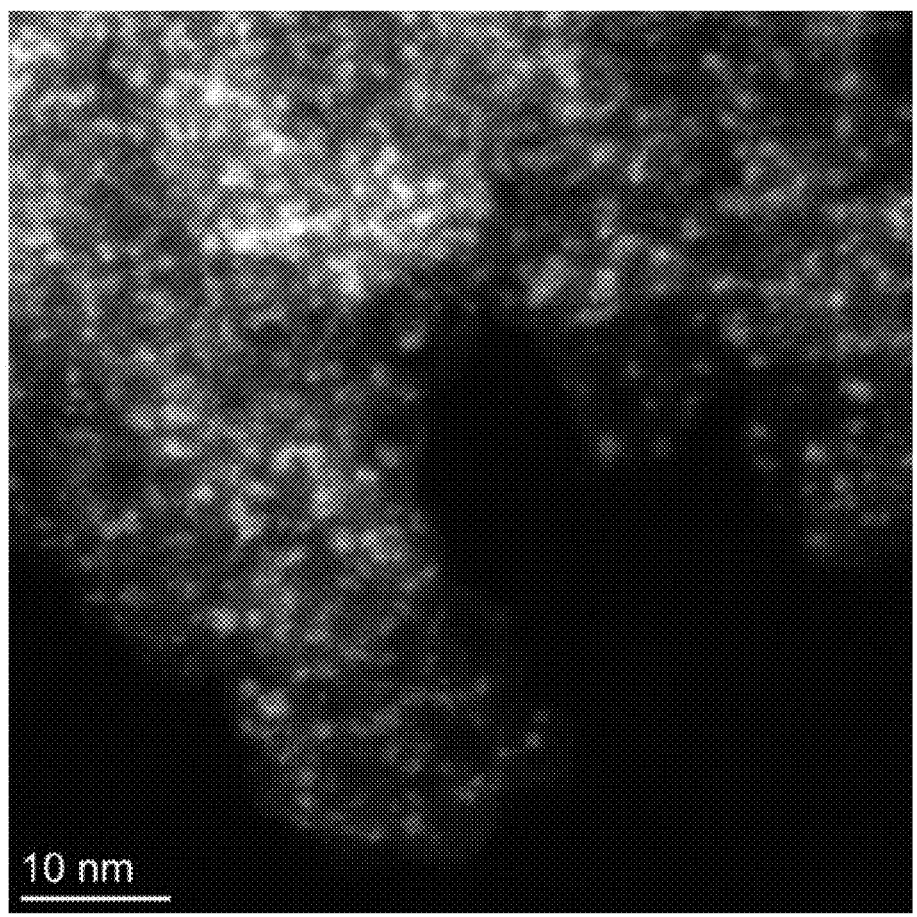
Figure 7C:
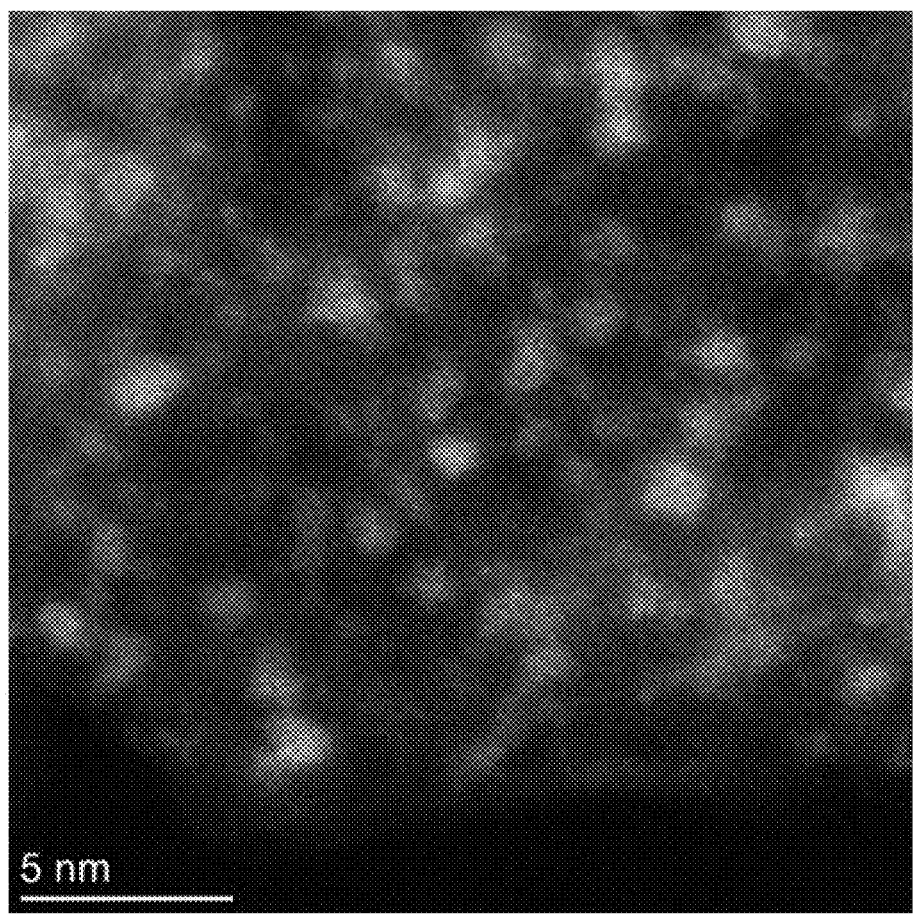
Figure 7D:
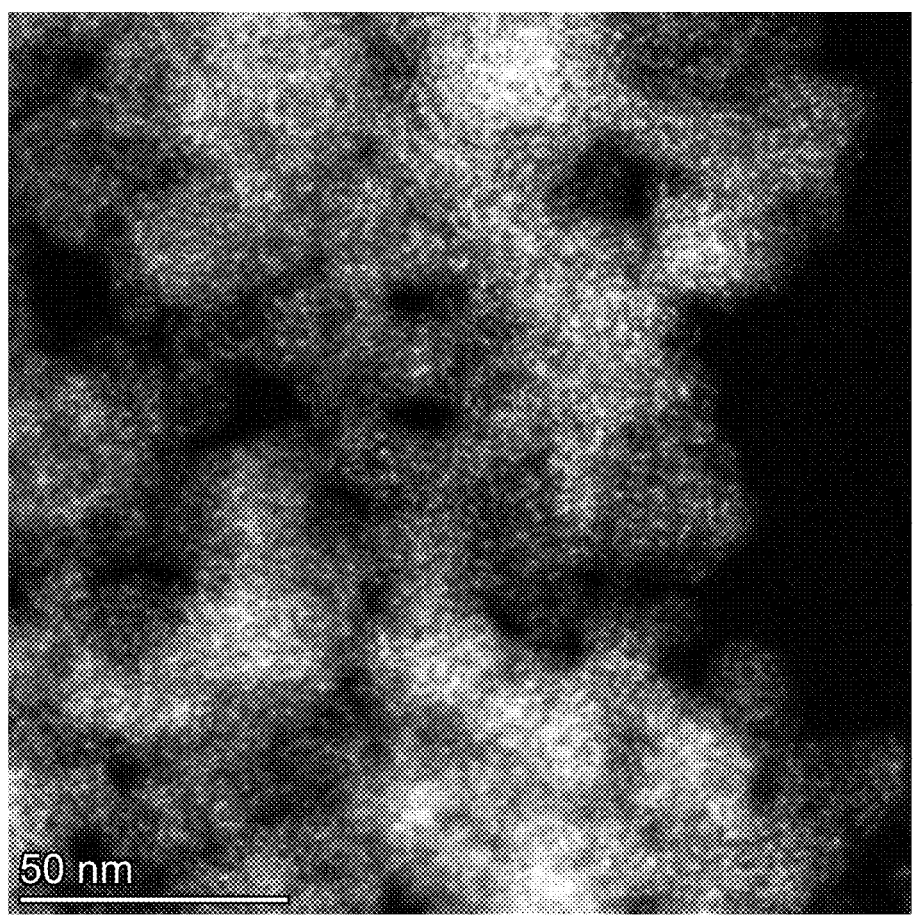
Figure 7E:
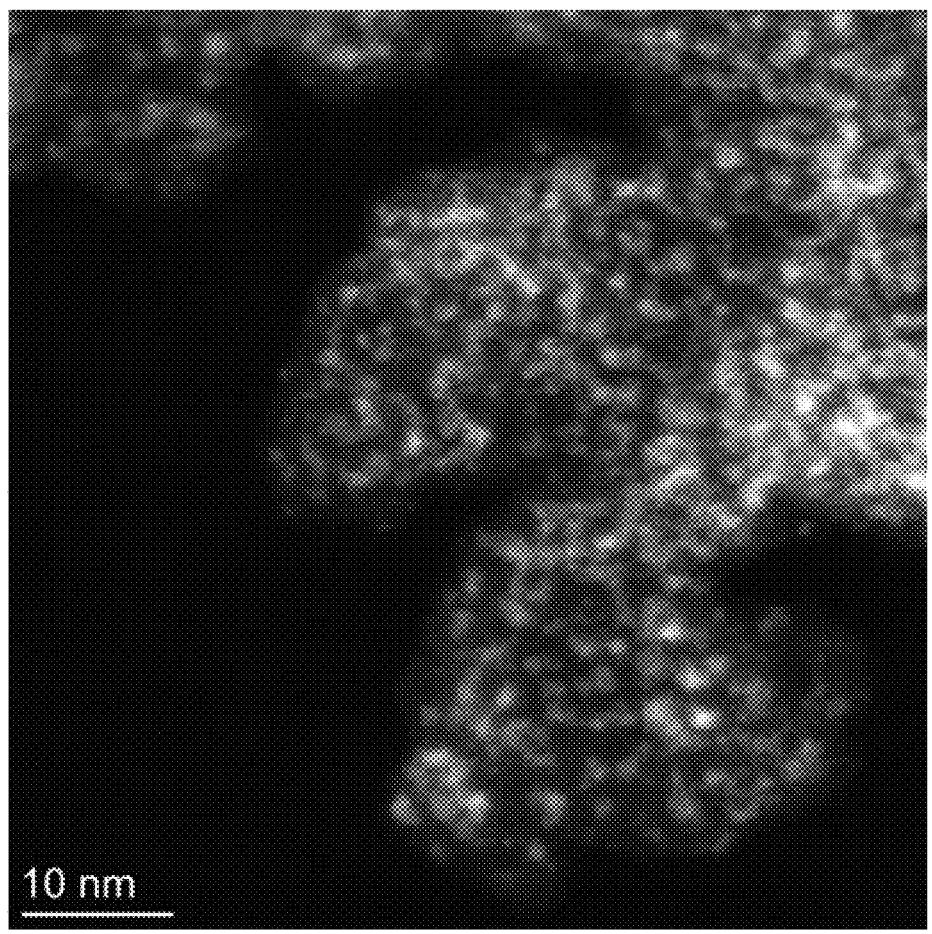
Figure 7F:
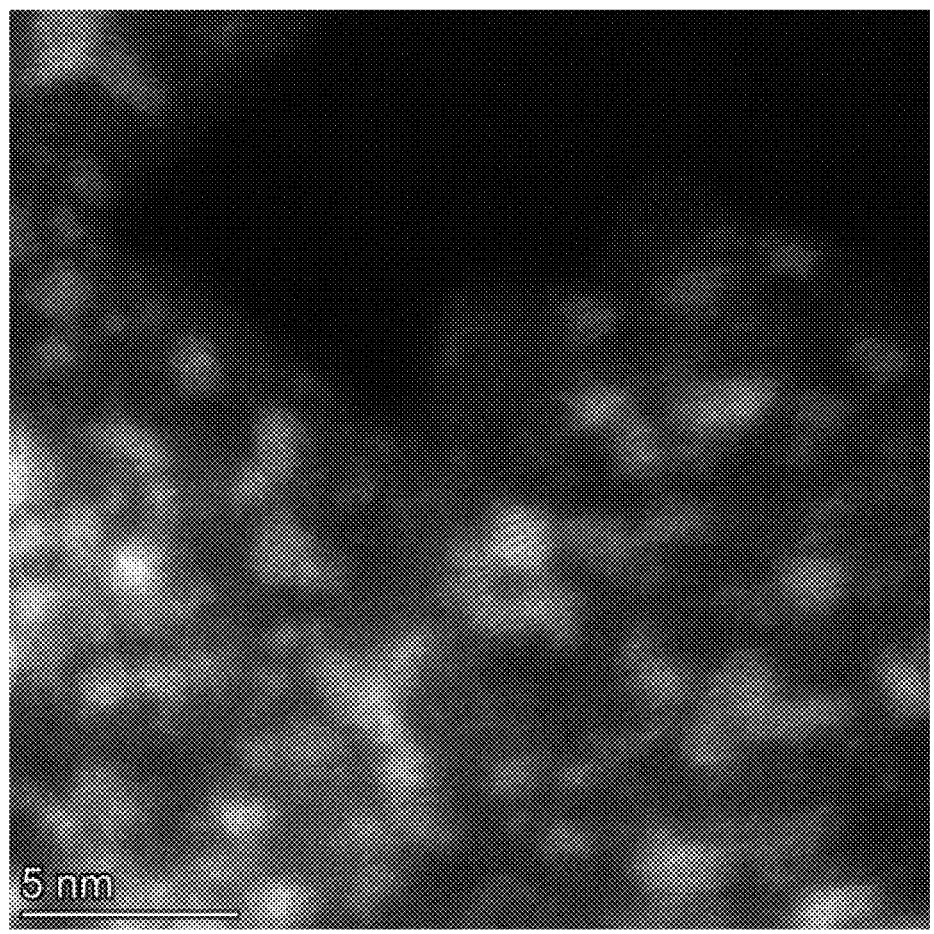

TGA was performed to determine the temperature required to remove the ligands of the organometallic precursor. FIG. 6 shows the derivative weight loss with respect to the temperature. When comparing the weight loss at –100° C. on carbon and acid-treated carbon, it can be concluded that the water content was higher in pristine carbon. The additional derivative weight loss at 220° C. may be associated to the elimination of the carboxylic groups, which demonstrates successful functionalization of carbon. Additionally, all the MoO$_x$/Carbon nanocomposites showed a weight loss at 800° C. or above, which is assigned to the decomposition of MoO$_x$ grafted to the carbon surface. As can be seen in FIG. 6, while the decomposition of the 5 wt. % Mo/Carbon sample takes place at 800° C., it happens at higher temperatures for 10 and 20 wt. % Mo, which may be due to an increased stability of the MoO$_x$ nanoparticles due to increased particle size. Additionally, the intensity of the weight loss for 10 wt. % Mo/Carbon is higher than that of the 5 wt. % Mo/Carbon sample, which is attributed to the higher MoO$_x$ loading. Remarkably, the intensity of that weight loss with 20 wt. % Mo/Carbon is lower; however, there is a broad evolution between 300 and 700° C. that may be attributed to physically or weakly absorbed precursor on the carbon surface. In fact, that evolution also appears at some extent with the 10 wt. % Mo/Carbon sample, which already indicates the depletion of the carboxylic groups on the carbon surface by anchorage of the precursor.

A good correlation between theoretical and actual Mo loading was confirmed by ICP-OES analysis, being these of 7.4, 12.7, and 19.5 wt. % for theoretical 5, 10, and 15 wt. %, respectively (Table 1). STEM images were also collected to study the dispersion of the MoO$_x$ nanoparticles onto the carbon surface (FIG. 7). The 10 wt. % Mo/Carbon nanocomposite exhibited a uniform dispersion of MoO$_x$ on the carbon surface, as observed in FIGS. 7A, 7B, 7C. An advantage of having small-size MoO$_x$ nanoparticles is the higher surface area for the sensor to react with the targeted gas. The STEM images also showed that increasing the Mo loading to 20 wt. % promoted the aggregation of the nanoparticles (FIGS. 7B, 7C, 7D), which is undesired as this reduces the surface area for the detection of formaldehyde.

TABLE 1

Theoretical and actual Mo loadings determined by ICP-OES.

| Sample (theoretical Mo loading) | Actual Mo loading (wt. %) |
|---|---|
| 5 wt. % Mo/Carbon | 7.4 |
| 10 wt. % Mo/Carbon | 12.7 |
| 20 wt. % Mo/Carbon | 19.5 |

Effect of Nafion on the Gold Electrode

Nafion contributes to the adhesion of the MoO$_x$-based nanocomposite to the electrode surface. In addition, Nafion is hygroscopic, which enables the conduction of protons and permits the access of formaldehyde gas to the MoO$_x$ surface. Furthermore, humidity has an influence on the Nafion permeability, which increases as the water content rises. The major advantages of Nafion are that it can conduct O$_2$ and H$_2$ at room temperature, and it can work as a solid-state electrolyte in which formaldehyde gas is dissolved.

Effect of the Different Layers on the Gold Electrode

Figure 8A:
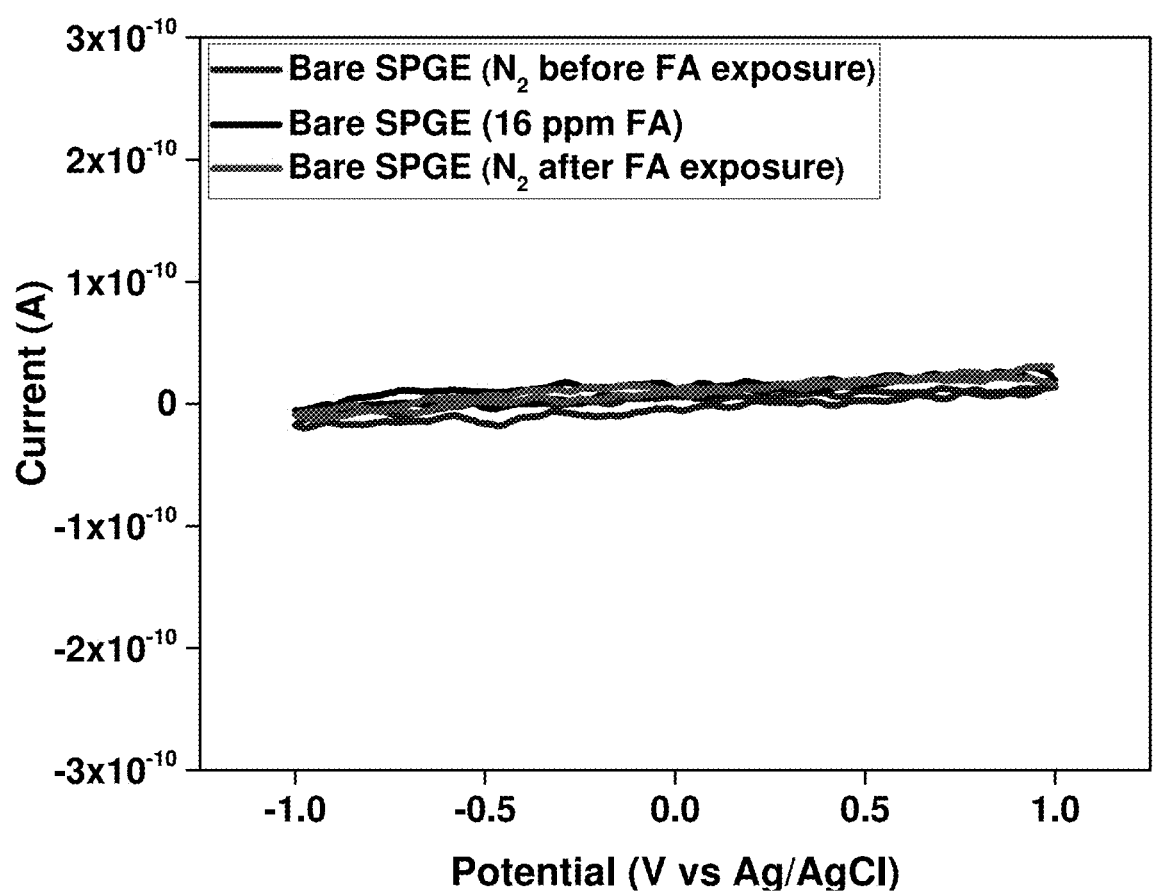
FIGS. 8A-8C: Cyclic voltammograms of bare SPGE (FIG. 8A), Nafion-SPGE (FIG. 8B), and carbon-SPGE (FIG. 8C) when flowing nitrogen ($N_2$) and formaldehyde (FA). $N_2$ before FA exposure (blue line); 16 ppm FA (black line); $N_2$ after FA exposure (dotted red line).
Figure 8B:
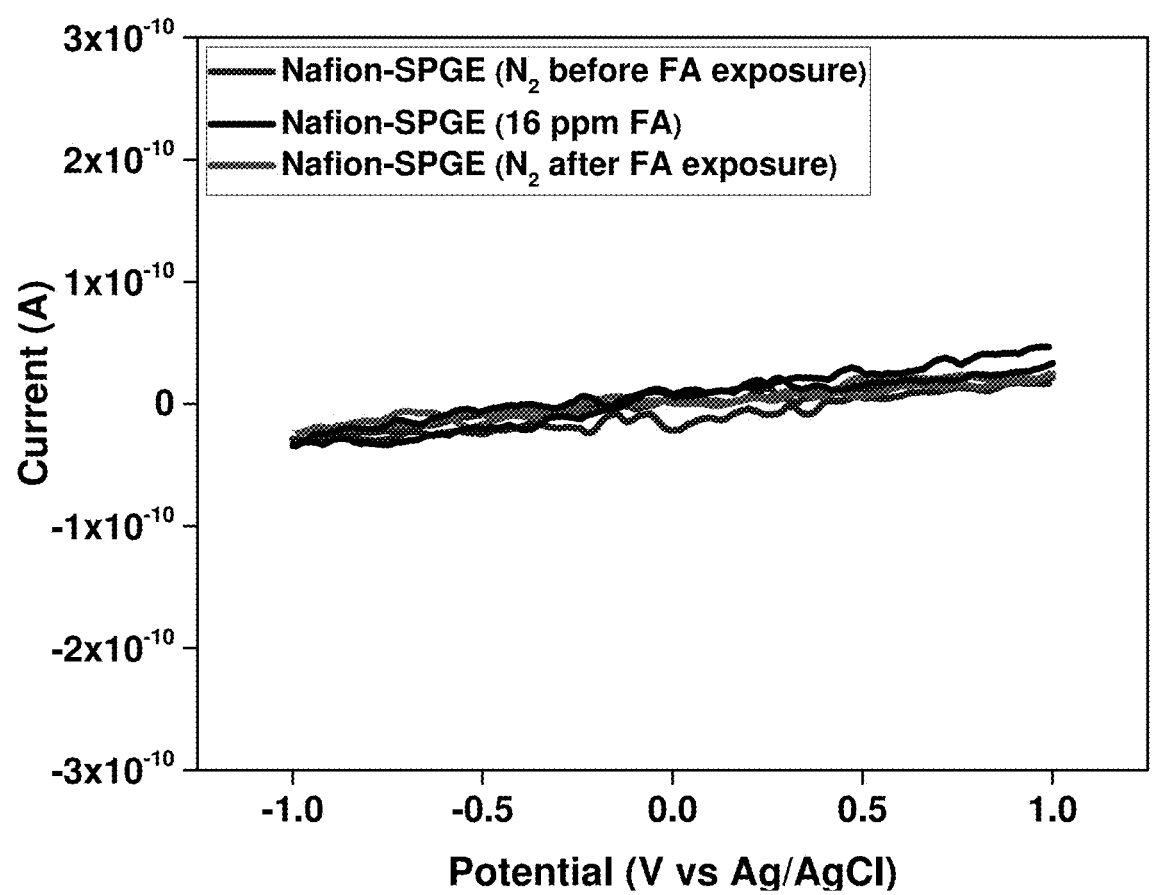
Figure 8C:
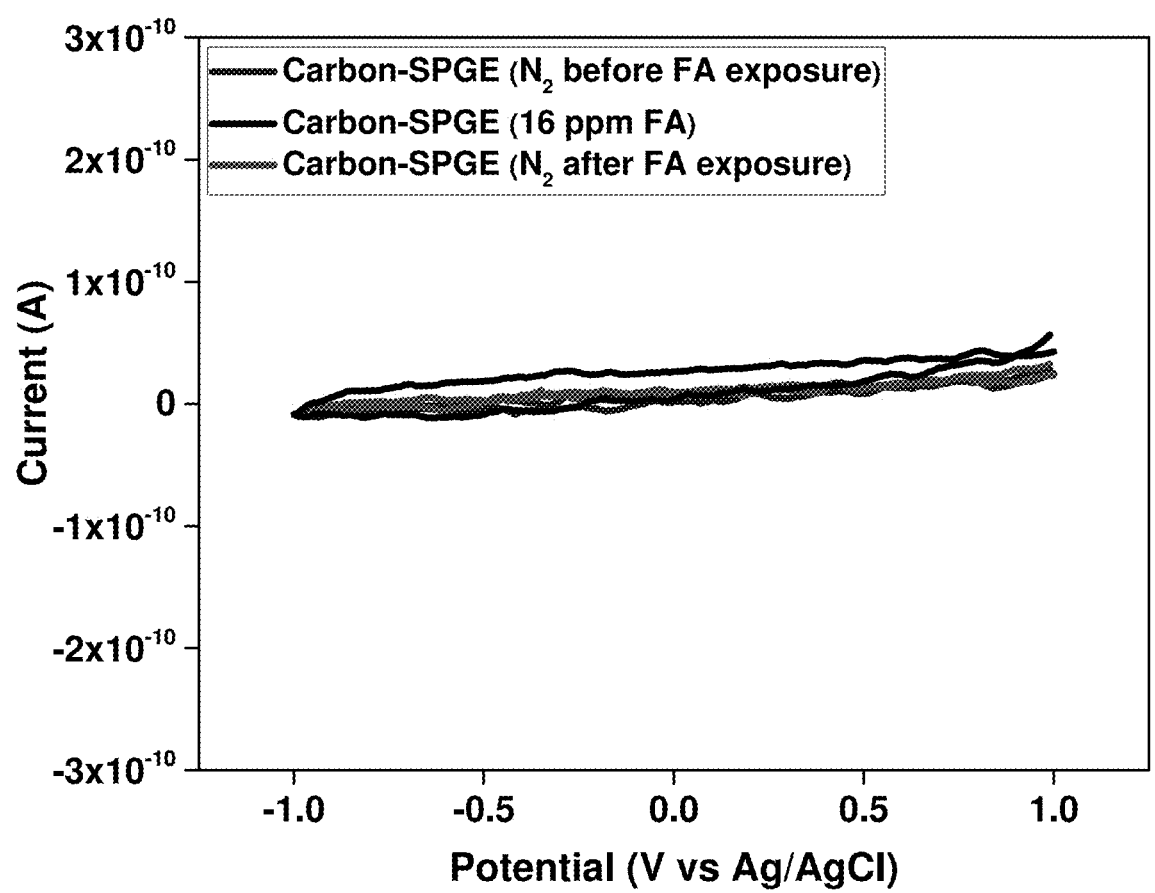
Figure 9A:
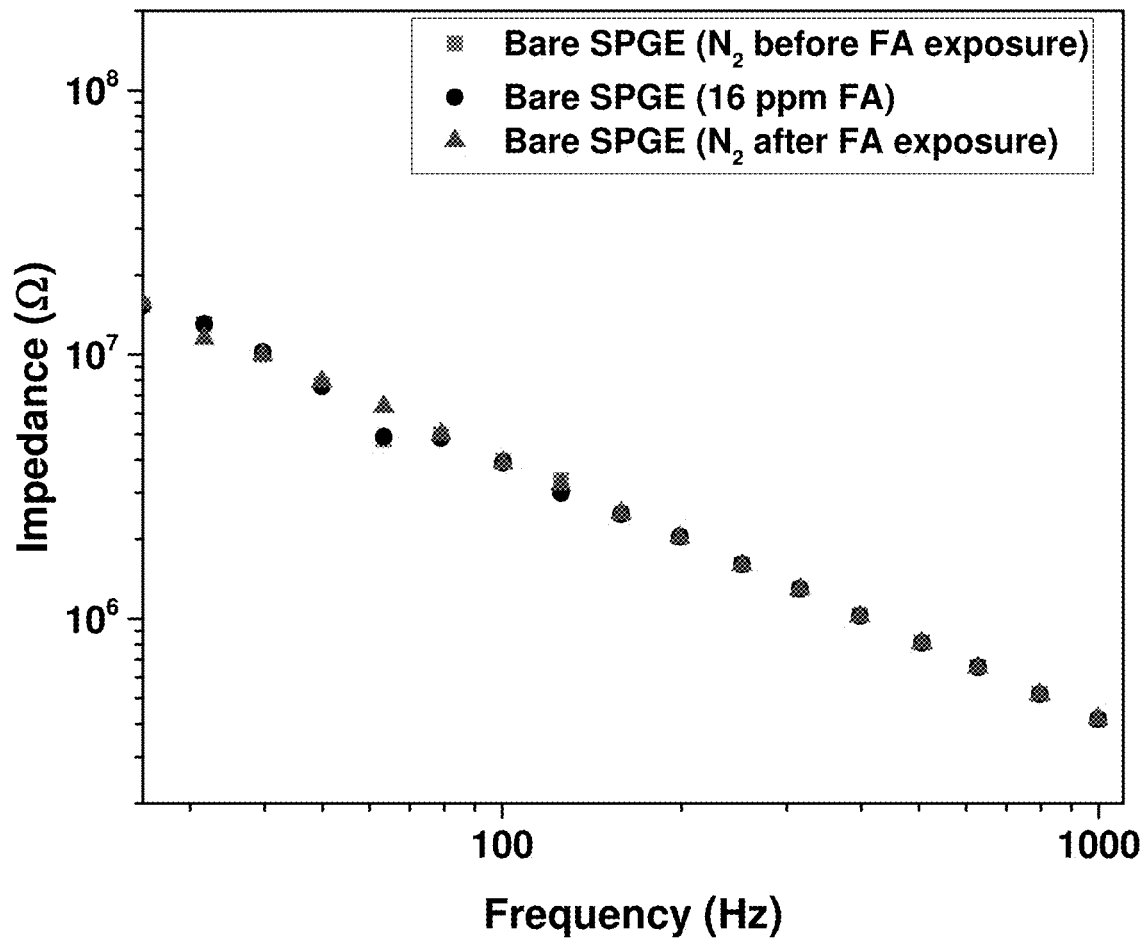
FIGS. 9A-9F: Electrochemical impedance spectroscopy (EIS) results and sensor resistance at 5 Hz with bare SPGE (FIGS. 9A, 9D), carbon-SPGE (FIGS. 9B, 9E), and Nafion-SPGE (FIGS. 9C, 9F) under nitrogen and formaldehyde. $N_2$ before FA exposure (blue+square dots); 16 ppm FA (black+round dots); $N_2$ after FA exposure (red+triangle dots).
Figure 9B:
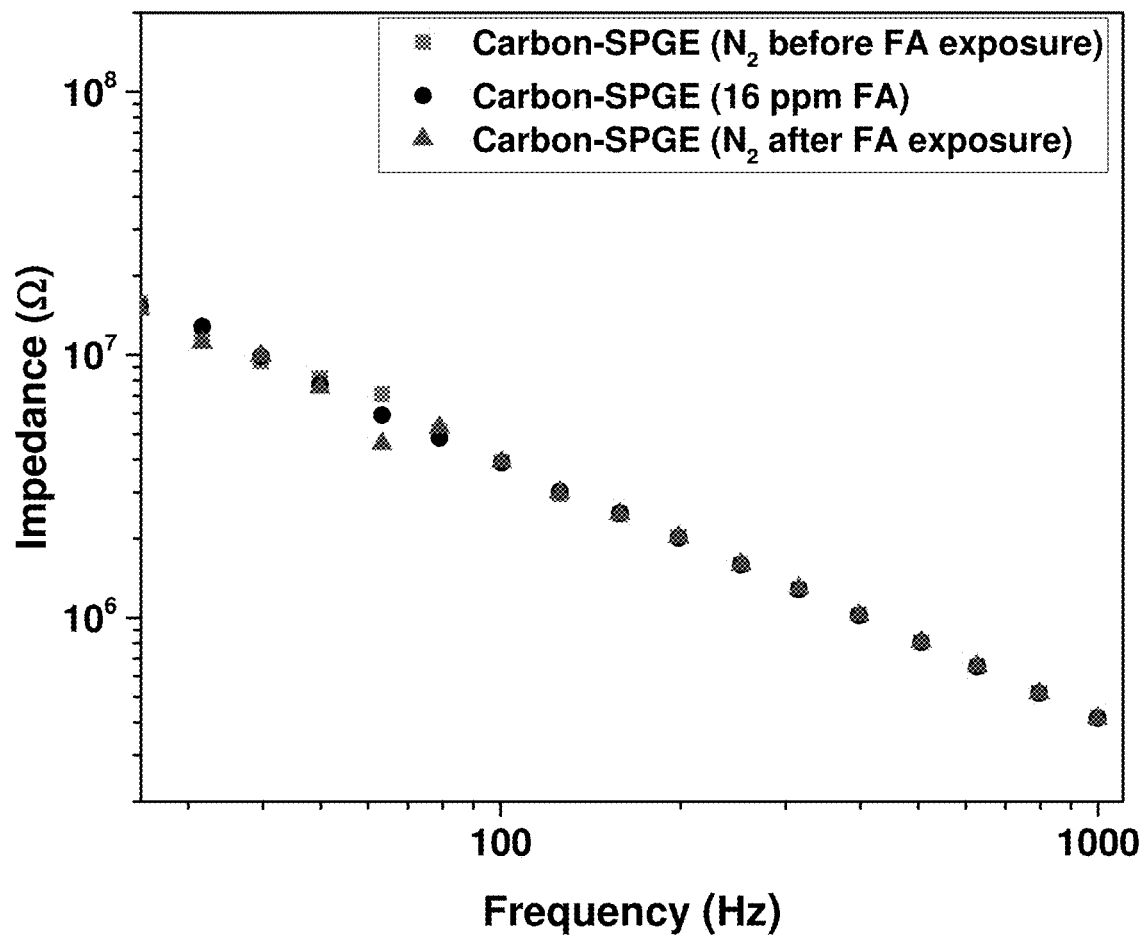
Figure 9C:
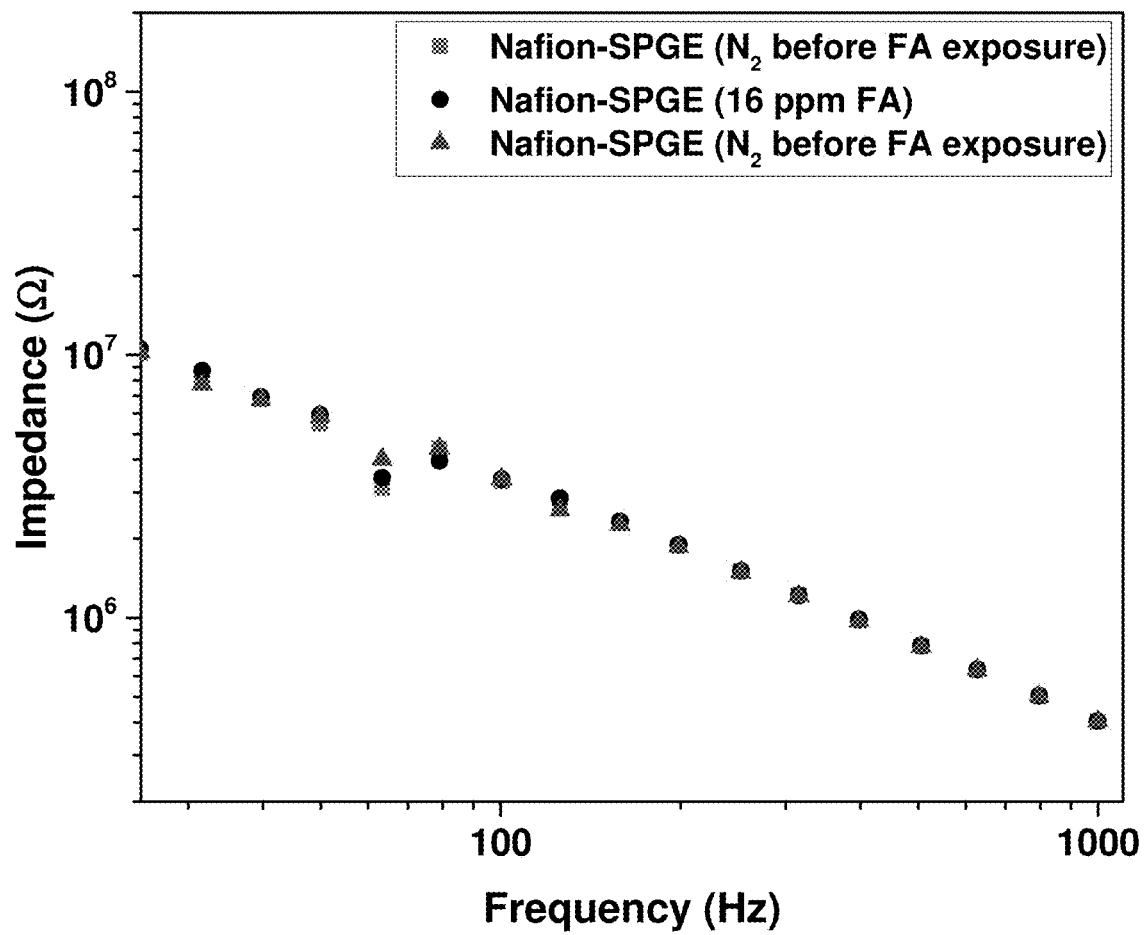
Figure 9D:
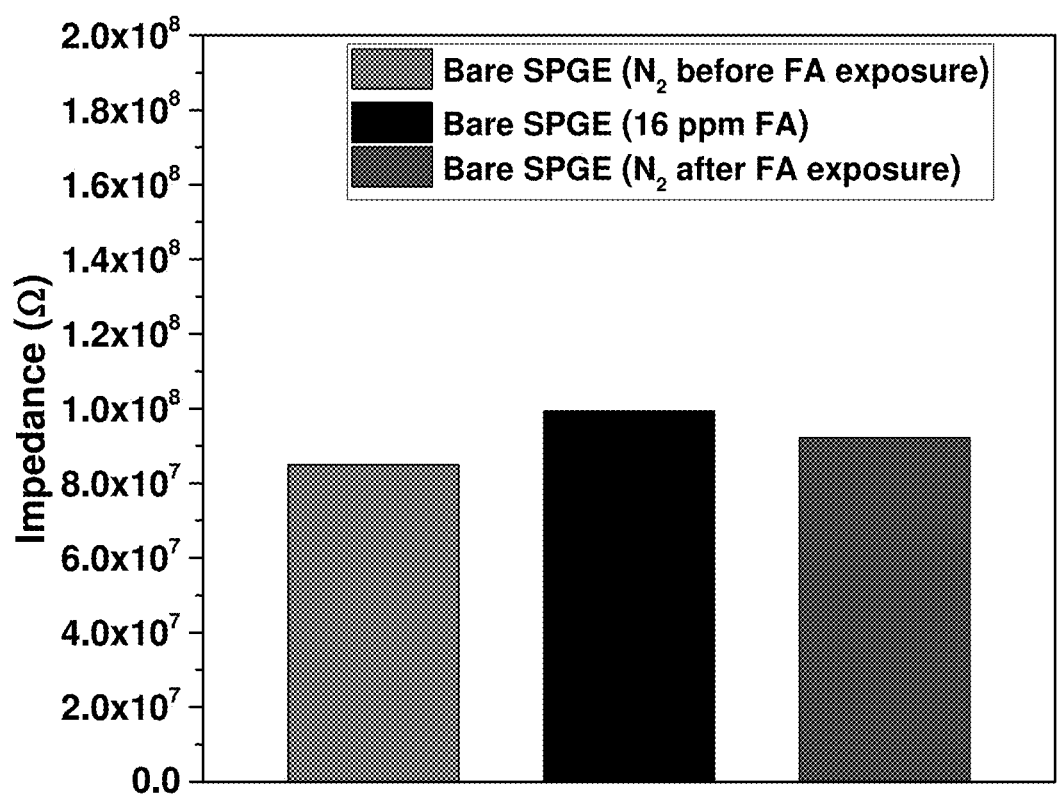
Figure 9E:
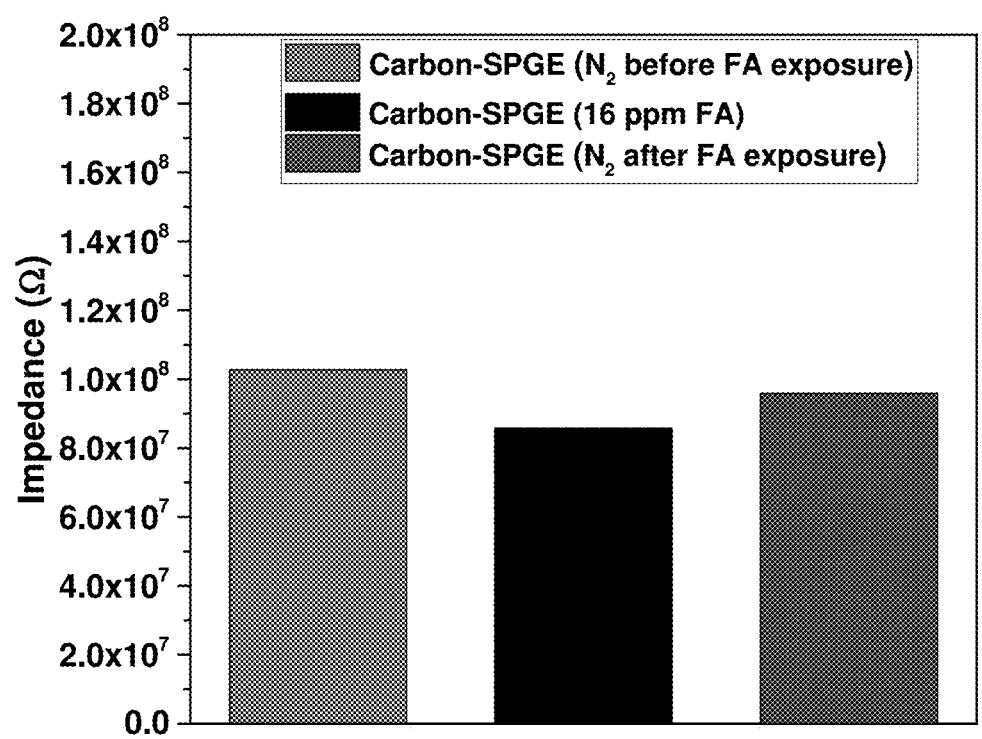
Figure 9F:
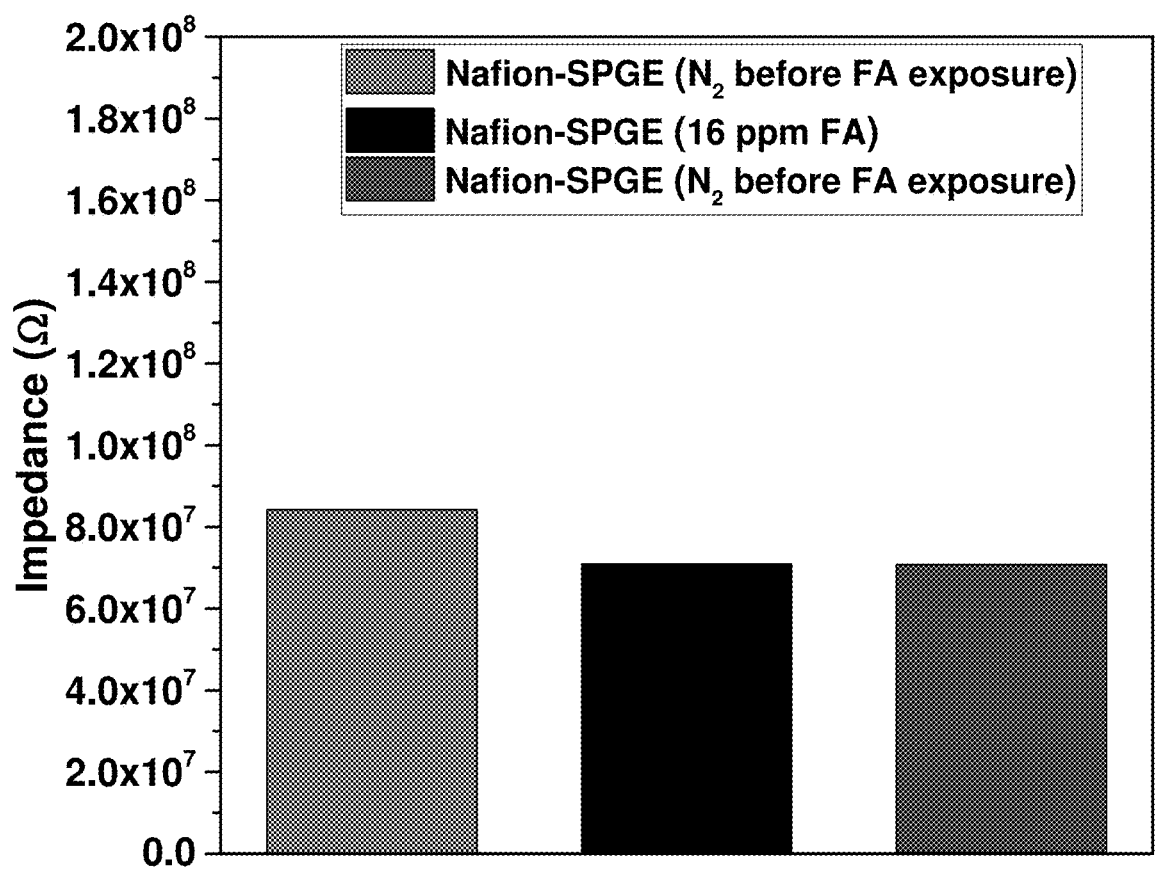

In order to investigate the influence of each layer on the Nafion-MoO$_x$/Carbon-SPGE, the sensor response was measured independently with every single layer as shown in FIGS. 8A-8C. In these experiments, nitrogen was used as a control to verify the selectivity of the Nafion-MoO$_x$/Carbon-SPGE to formaldehyde gas. As stated above, CV and EIS experiments were performed under constant gas flow of 10 mL/min at room temperature with 90% RH. First, cyclic voltammograms of a bare SPGE, an electrode modified with acid-treated carbon, and an electrode modified with Nafion were compared in the detection of nitrogen and formaldehyde gas as shown in FIGS. 8A-8C. All of them presented negligible sensor response (6-8 pA) to nitrogen, and there was still no response after flowing formaldehyde gas into the testing chamber. This is due to the lack of MoO$_x$ on the electrode for the detection of formaldehyde gas. The same experimental trend was observed when conducting EIS experiments (FIG. 9), with all the bare SPGE, acid-treated carbon-SPGE, and Nafion-SPGE showing a constant resistance in the presence of formaldehyde gas or when flowing nitrogen before or after exposure to formaldehyde gas, which indicated that the resistance was unaffected by formaldehyde. Therefore, the bare SPGE, and the electrode modified with acid-treated carbon or Nafion, do not significantly interact with formaldehyde gas. Thus, MoO$_x$ was important for the detection formaldehyde.

Effect of the MoO$_x$ Loading on the Sensor Response

Figure 10:
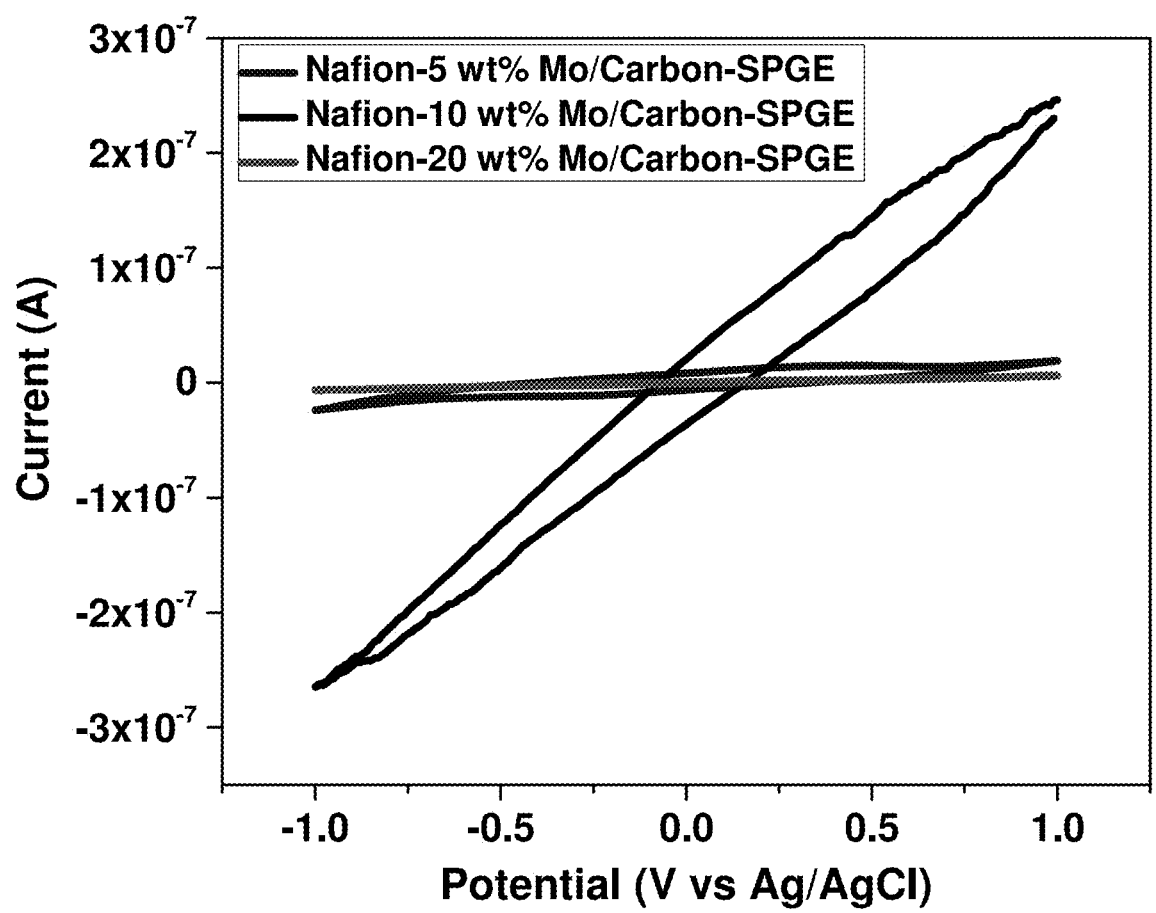
FIG. 10: Cyclic voltammograms of Nafion-5, 10, and 20 wt. % Mo/Carbon-SPGE to 0.1 ppm of formaldehyde gas. 5 wt. % (black line), 10 wt. % (blue line), and 20 wt. % (red line).

The sensor response to 0.1 ppm of formaldehyde gas with 5, 10, and 20 wt. % Mo/Carbon nanocomposites is shown in FIG. 10. While the Nafion-5 wt. % Mo/Carbon-SPGE showed a ΔA of 0.0324 µA, Nafion-10 and 20 wt. % Mo/Carbon-SPGE showed 0.503 and 0.0122 µA, respectively. The Nafion-5 wt. % Mo/Carbon-SPGE showed lower ΔA to formaldehyde gas than Nafion-10 wt. % Mo/Carbon-SPGE due to the lower loading of the sensing element (MoO$_x$). Similarly, the Nafion-20 wt. % Mo/Carbon-SPGE showed the lowest ΔA of the series, likely due to the high degree of aggregation of the MoO$_x$ nanoparticles that resulted in lower surface area to react with formaldehyde. The effect of the MoO$_x$ loading on the degree of aggregation was also observed in the STEM images shown in FIG. 7. The maximum ΔA to formaldehyde gas was obtained with the 10 wt. % Mo/Carbon nanocomposite, which may be attributed to the higher surface area from the homogeneous dispersion of MoO$_x$ nanoparticles on the carbon surface. From the experimental results, it was concluded that the Nafion-10 wt. % Mo/Carbon-SPGE possessed an advantageous sensor ability for the detection of formaldehyde gas.

Figure 11:
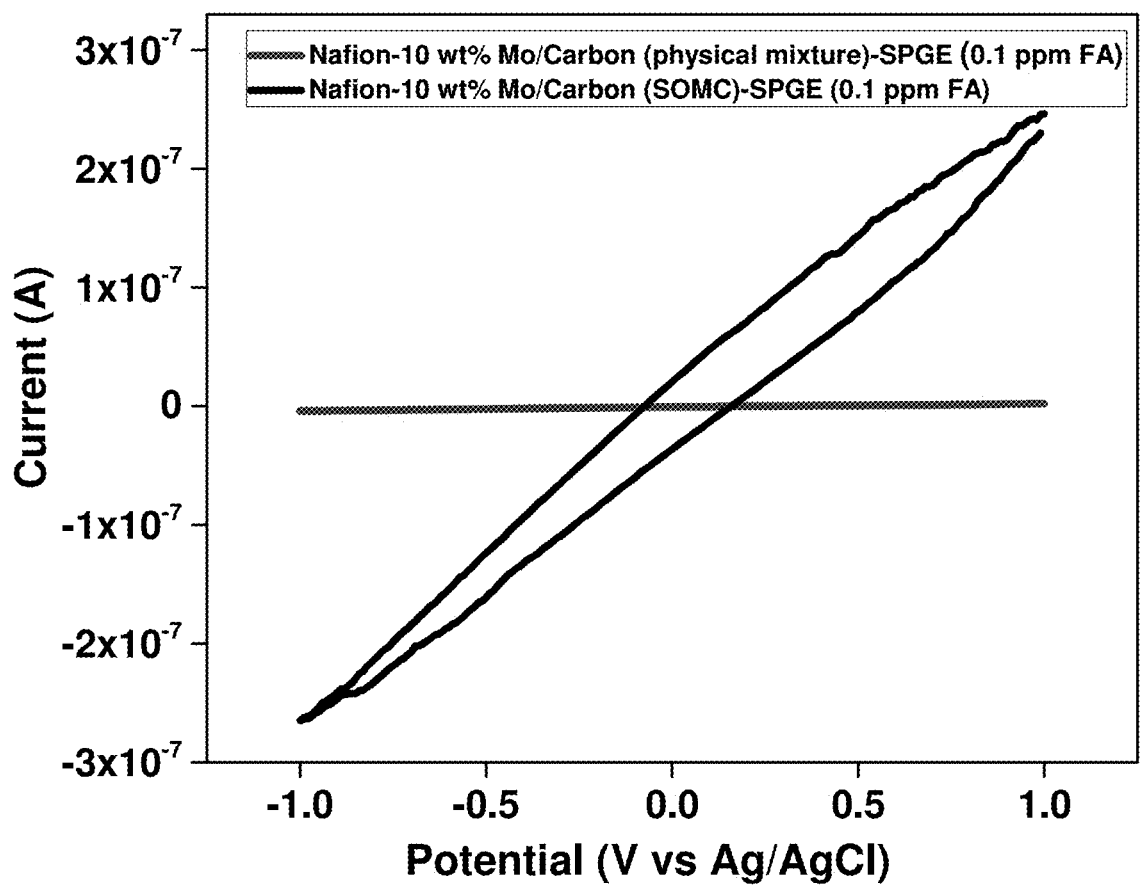
FIG. 11: Cyclic voltammograms of Nafion-10 wt. % Mo/Carbon-SPGE synthesized by SOMC vs. physical mixture to 10 ppm of formaldehyde gas. Physical mixture-SPGE 0.1 ppm FA (blue line); SOMC-SPGE 0.1 ppm FA (Black line).

To further study the effect of the synthesis method and the dispersion of $MoO_x$ on the sensitivity of the sensor, another composite was synthesized by physical mixture of commercial $MoO_3$ and acid-treated carbon with 10 wt. % Mo loading. As shown in FIG. 11, this composite provided a smaller ΔA of 0.0063 µA compared to the 10 wt. % Mo/Carbon nanocomposite synthesized by SOMC, which further highlights the importance of the high dispersion obtained by the surface organometallic chemistry (SOMC) method. Therefore, the sensor response for the detection of formaldehyde is not only influenced by the $MoO_x$ loading but also the synthesis method of the nanocomposites.

Gas Sensing Properties of Nafion-10 wt. % Mo/Carbon-SPGE

Figure 12A:
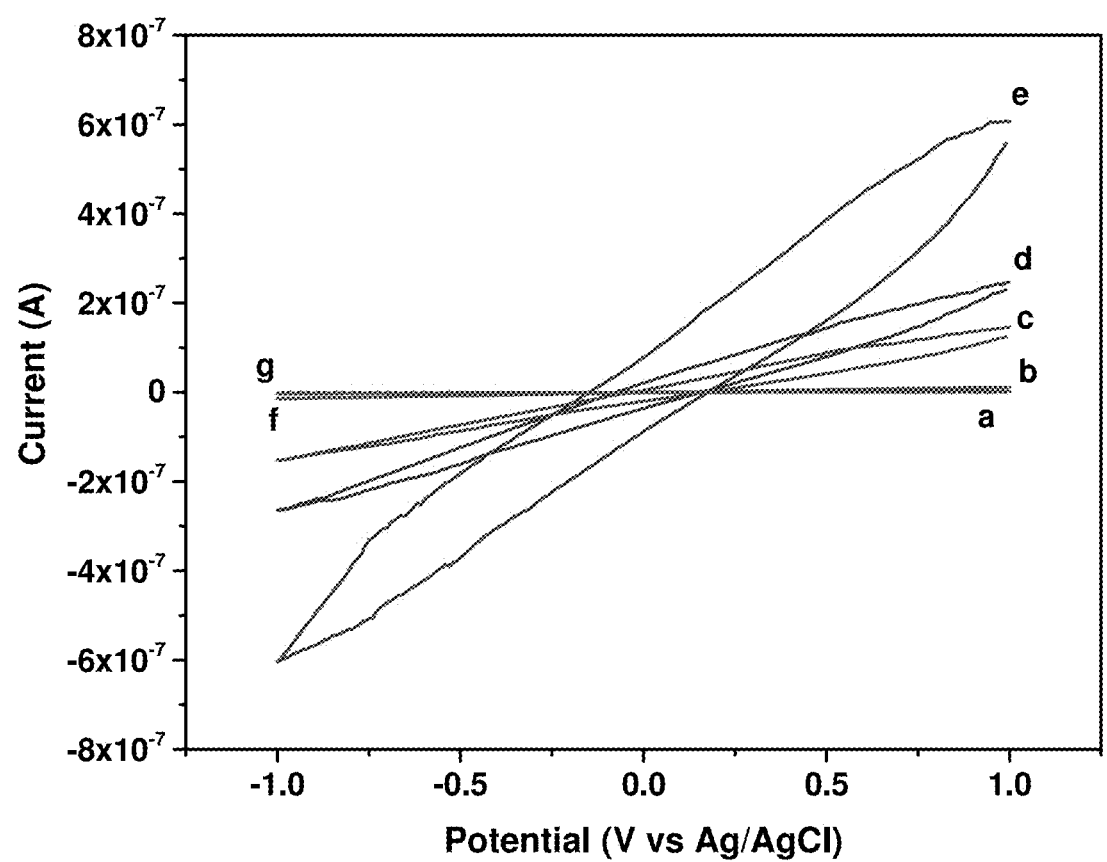
FIG. 12A: Cyclic voltammetry (CV) results with Nafion-10 wt. % Mo/Carbon-SPGE for nitrogen before formaldehyde exposure (control) (FIG. 12A, line a), nitrogen after formaldehyde exposure (recovery) (FIG. 12A, line b), 0.01 ppm (FIG. 12A, line c), 0.1 ppm (FIG. 12A, line d), 1 ppm (FIG. 12A, line e), 0.005 ppm (FIG. 12A, line f), and 0.0025 ppm (FIG. 12A, line g) of formaldehyde gas.
Figure 12B:
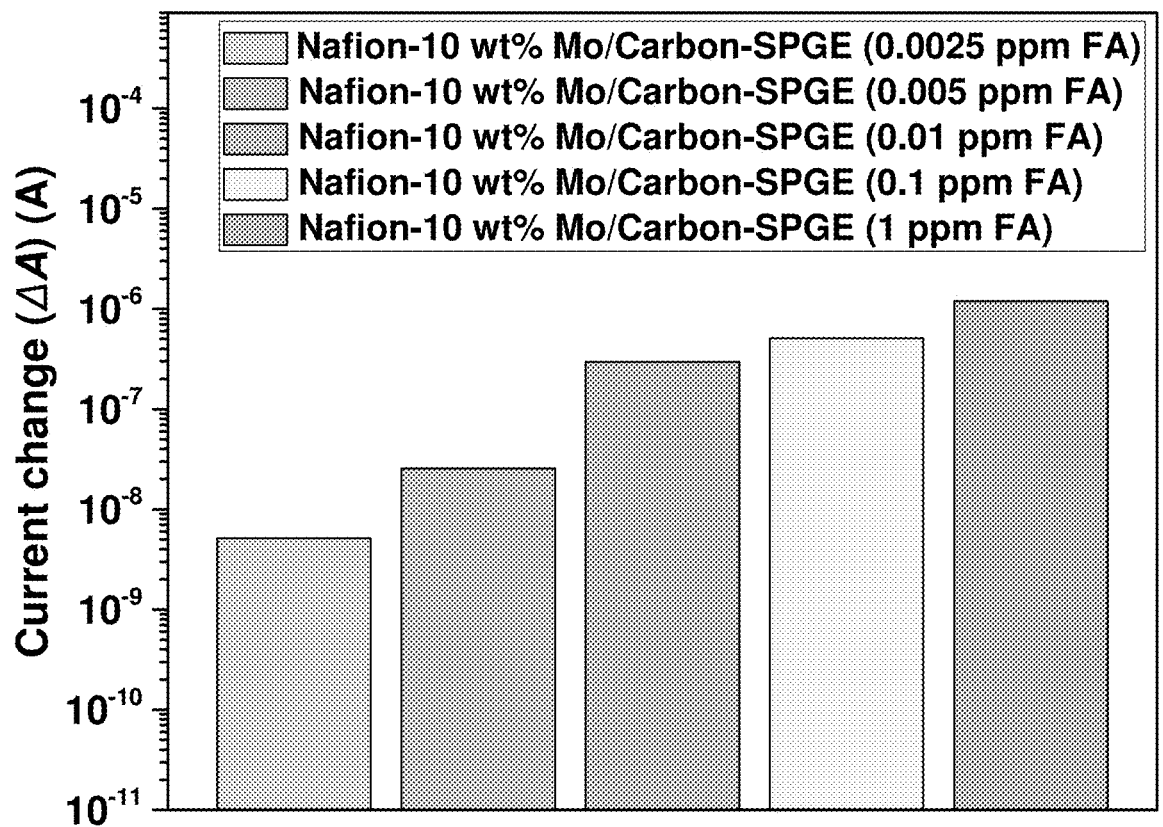
FIG. 12B: Current Change (ΔA (A) from left to right: 0.0025 ppm (orange); 0.005 ppm (green); 0.01 ppm (purple); 0.1 ppm (yellow); 1 ppm (blue).

Once an advantageous $MoO_x$ loading in the nanocomposite for the detection of formaldehyde (namely, 10 wt. % Mo/Carbon) was identified, the sensor response of Nafion-10 wt. % Mo/Carbon-SPGE towards different concentrations of formaldehyde gas was investigated. To achieve that, the Nafion-10 wt. % Mo/Carbon-SPGE was exposed to 0.0025, 0.005, 0.01, 0.1, and 1 ppm formaldehyde gas as shown in FIGS. 12A-12B. The highest ΔA was obtained when exposing the gas sensor to 1 ppm of formaldehyde gas (1.20 µA), followed by 0.503, 0.295, 0.0256, and 0.00512 µA with 0.1, 0.01, 0.005, and 0.0025 ppm of formaldehyde gas, respectively. The ΔA with Nafion-10 wt. % Mo/Carbon-SPGE significantly increased in the presence of formaldehyde when compared to the bare SPGE, acid-treated carbon-SPGE, and Nafion-SPGE, as shown in FIG. 8. Moreover, ΔA with Nafion-$MoO_x$/Carbon-SPGE instantly dropped after replacing formaldehyde by nitrogen, which indicated a rapid sensor response and recovery to formaldehyde gas. Therefore, the Nafion-10 wt. % Mo/Carbon-SPGE was able to detect the presence of formaldehyde at concentrations as low as 5 ppb with the sensor response being generated from the interaction between $MoO_x$ and formaldehyde gas.

Figure 13D:
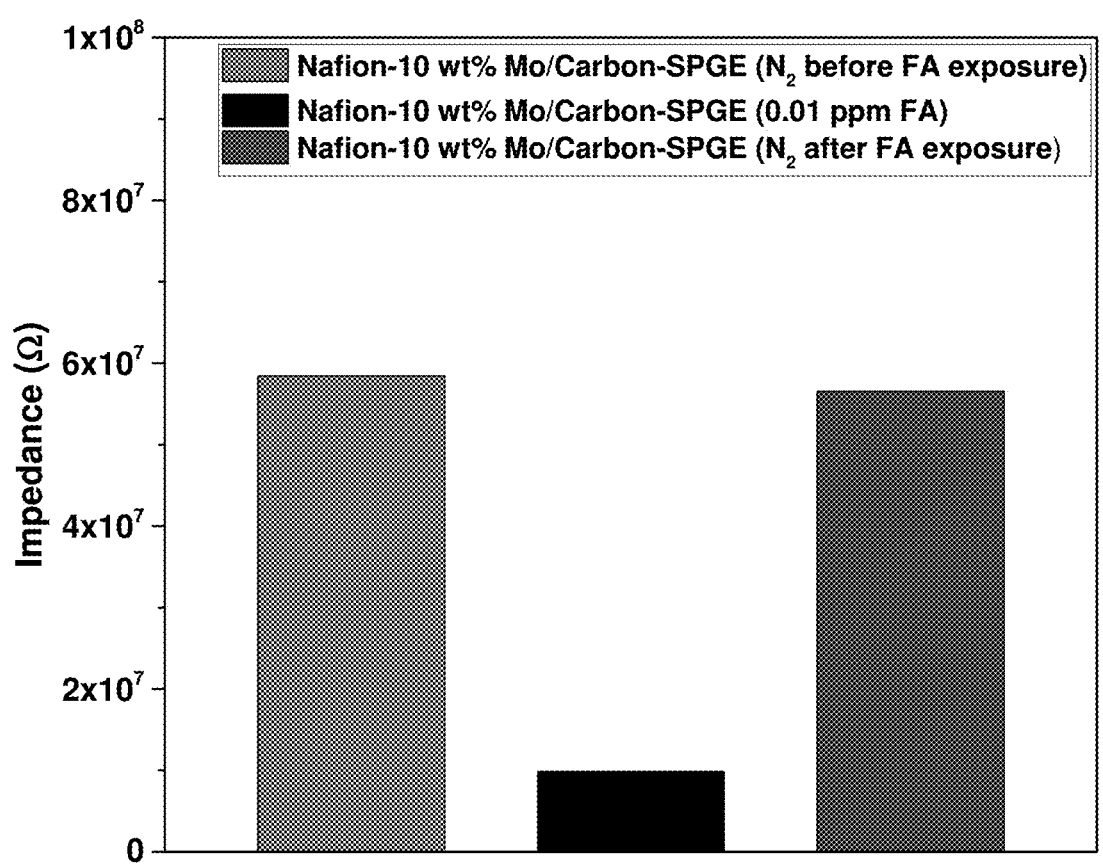
Figure 13E:
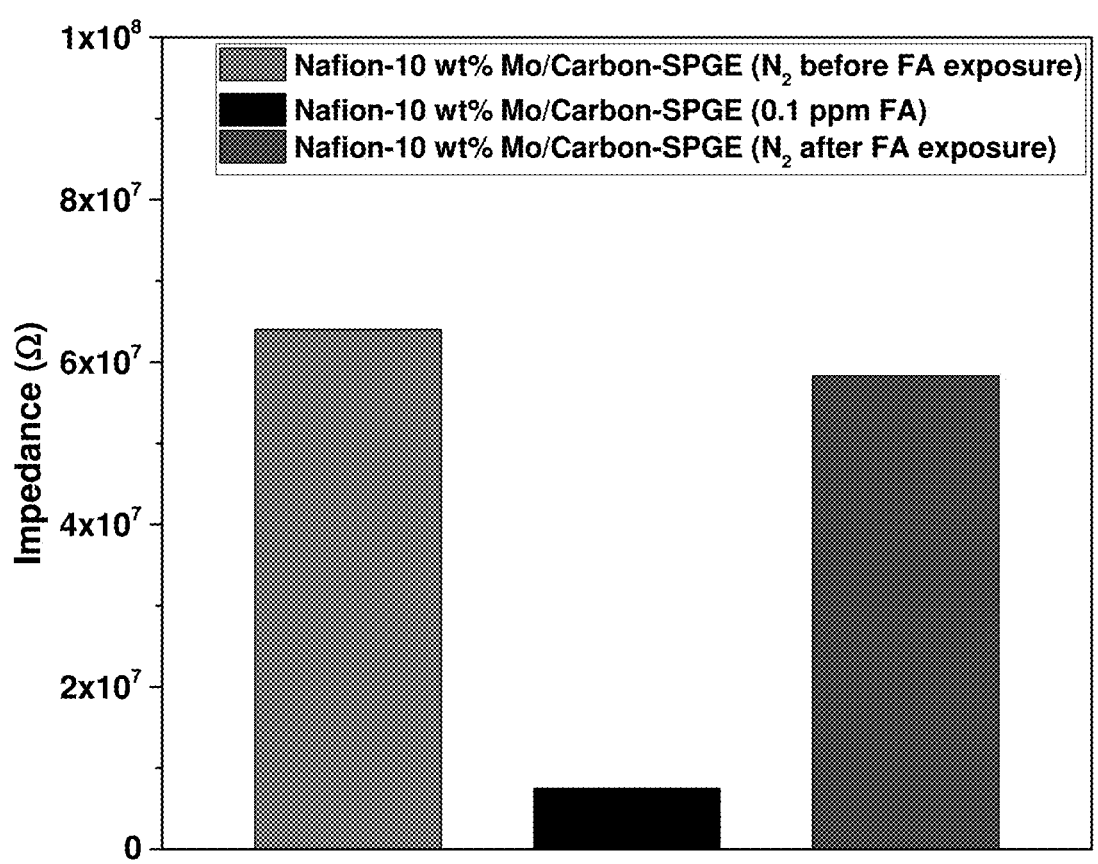
Figure 13F:
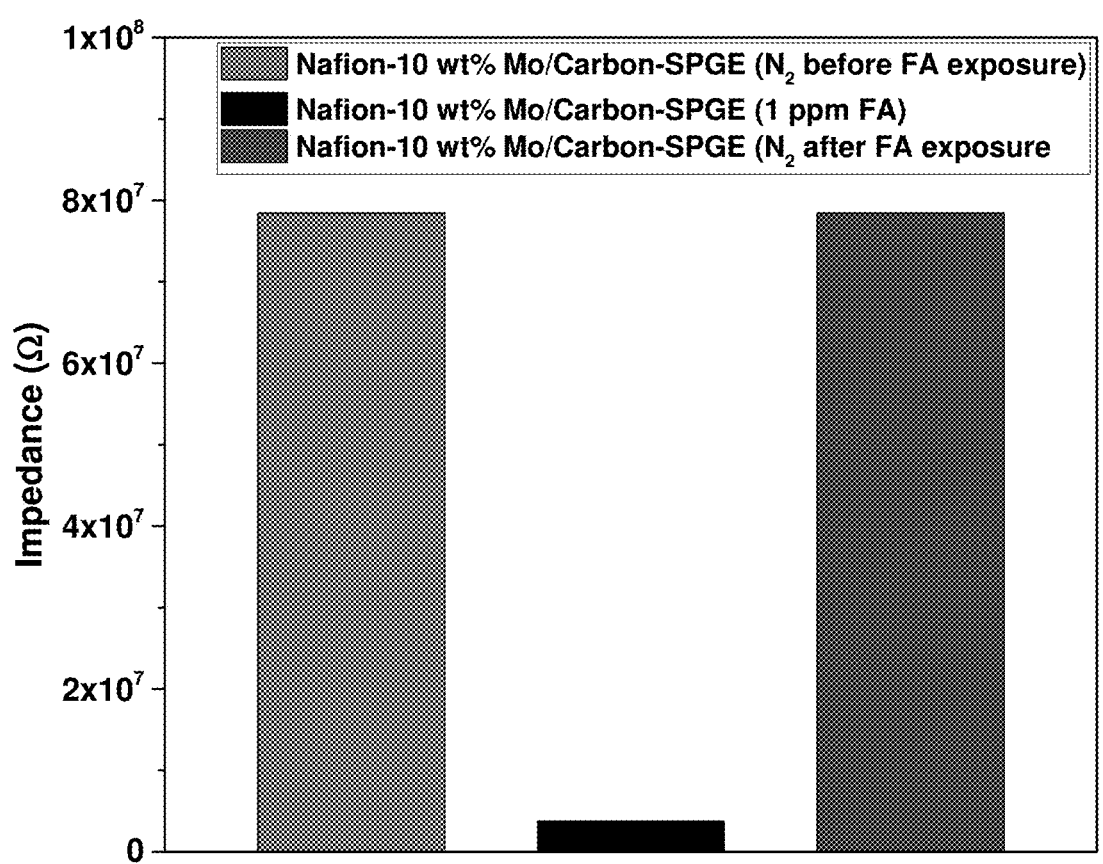

EIS analyzes the impedance of a surface-modified electrode at different frequencies. EIS measurements are able to analyze changes in the interfacial properties of a surface-modified electrode. A low frequency of 5 Hz was used to study the resistance changes on the electrode surface of Nafion-10 wt. % Mo/Carbon-SPGE. As can be seen in FIGS. 13D, 13E, 13F, the sensor resistance decreased with increased concentration of formaldehyde gas, being this of 9.88, 7.52, and 3.79 MΩ in the presence of 0.01, 0.1, and 1 ppm of formaldehyde, respectively. The higher sensor resistance with 0.01 ppm formaldehyde is due to a limited interaction between the low concentration of formaldehyde and $MoO_x$ on the electrode surface, which causes a lack of electron transfer at the electrode interface. The EIS results showed the same trend as CV, with the sensor resistance decreasing with increased concentrations of formaldehyde gas.

One of the most important parameters in the development of sensors is the selectivity towards a target molecule. In this example, the selectivity of the Nafion-10 wt. % Mo/Carbon-SPGE towards different VOCs was also evaluated. FIG. 14 shows the sensor response to 0.1 ppm of acetone, ethanol, methanol, isopropyl alcohol, and formaldehyde. Here, the selectivity towards different VOCs was evaluated independently. Remarkably, the ΔA of Nafion-10 wt. % Mo/Carbon-SPGE toward 0.1 ppm of formaldehyde was more than an order of magnitude higher than those of methanol and isopropyl alcohol, and more than two orders of magnitude higher than acetone and ethanol. The significant difference in the ΔA of formaldehyde as a target gas compared to other VOCs indicates that the Nafion-10 wt. % Mo/Carbon-SPGE has an excellent selectivity towards formaldehyde gas even at low concentrations with insignificant sensor response towards other VOCs. These results confirmed that $MoO_x$ is capable of the selective electrochemical detection of formaldehyde.

Nyquist Plot Using a Nafion-10 wt. % Mo/Carbon-SPGE

The interaction between Nafion-10 wt. % Mo/Carbon-SPGE and formaldehyde gas was also investigated by using EIS. FIG. 15E illustrates the Nyquist plots obtained from the faradaic impedance spectra with the response of Nafion-10 wt. % Mo/Carbon-SPGE towards different concentrations of formaldehyde. All Nyquist plots with 0.01, 0.1, and 1 ppm formaldehyde gas show a semicircle at high frequency that represents the charge transfer resistance, which indicates that there is no diffusion limitation when using Nafion-10 wt. % Mo/Carbon-SPGE in the detection of formaldehyde. The diameter of the semicircles at high frequencies increases when decreasing the concentration of formaldehyde gas, which shows the same trend as cyclic voltammograms (FIG. 12) and Bode plots (FIG. 15C) in terms of the sensor resistance, with sensor resistance decreasing as the concentration of formaldehyde gas increases. These results indicate that the Nafion-10 wt. % Mo/Carbon-SPGE is not only able to detect formaldehyde but it can also provide its concentration.

Bode plots and phase angle shift of bare SPGE, acid-treated carbon-SPGE, and Nafion-SPGE were also recorded in order to estimate the electrical behavior on the electrode surface towards nitrogen and formaldehyde gases (FIGS. 15A, 15B). The path of the Bode plots shows unaffected impedance to nitrogen and formaldehyde at both low and high frequencies, as shown in FIG. 15A. Moreover, bare SPGE, carbon-SPGE, and Nafion-SPGE show the same profile of phase change for both nitrogen and formaldehyde gases, as shown in FIG. 15B. This confirms that the electrochemical sensor has no response to formaldehyde gas in the absence of the $MoO_x$ sensing element. However, once that the electrochemical sensor is modified with 10 wt. % $MoO_x$ (Nafion-10 wt. % Mo/Carbon-SPGE), the sensor response to formaldehyde gas is completely different than that with bare SPGE, carbon-SPGE, and Nafion-SPGE. As displayed in FIGS. 15C, 15D, the sensor resistance and the phase change vary according to the concentration of formaldehyde gas. However, there is not a significant identity of phase angle on formaldehyde as compared to nitrogen in the range of 5 to 1000 Hz. Therefore, EIS was implemented at lower frequencies ranging from 0.01 to 0.1 Hz to investigate and identify the phase angle shift of formaldehyde gas on Nafion-10 wt. % Mo/Carbon-SPGE. As shown in FIG. 15F, there is no phase angle shift at ultra-low frequency when using untargeted gases (methanol, isopropyl alcohol, and nitrogen). However, Nafion-10 wt. % Mo/Carbon-SPGE shows a noteworthy phase angle shift at 0.05 Hz in presence of formaldehyde. The appearance of a phase angle shift at 0.05 Hz proves the high selectivity of the Nafion-10 wt. % Mo/Carbon-SPGE towards formaldehyde.

Mechanism for the Gas Sensor

The cyclic voltammograms displayed in FIG. 12 demonstrated the interaction between the surface of the Nafion-10 wt. % Mo/Carbon-SPGE and formaldehyde gas. The reaction of $MoO_x$ on the surface of the electrochemical sensor with formaldehyde gas results in an increase of the sensor conductivity, referred to as current change (ΔA). However, the semicircle shape of the Nyquist plots in FIG. 15E indicates the formation of a by-product. Supplementary high-performance liquid chromatography (HPLC) studies before and after CV when using Nafion-10 wt. % Mo/Carbon-SPGE and a 50-ppm formaldehyde liquid solution confirmed the presence of formic acid. Therefore, the proposed mechanism for the detection of formaldehyde by Nafion-10 wt. % Mo/Carbon-SPGE is the partial oxidation of formaldehyde to formic acid and reduction of $MoO_x$ (FIG. 16).

CONCLUSIONS $MoO_x$/Carbon nanocomposites were successfully synthesized by using surface organometallic chemistry (SOMC) and were characterized by FTIR, TGA, STEM, and ICP-OES. FTIR spectra showed successful functionalization of the carbon surface and anchorage of the organometallic precursor to the carboxylic groups on the carbon support. TGA provided the temperature necessary to decompose the ligands of the molybdenum precursor and allowed for distinguishing between physically and chemically sorbed species. A gold electrode modified with a 10 wt. % $MoO_x$/Carbon nanocomposite and Nafion provided a gas sensor with high sensitivity and selectivity towards formaldehyde gas. The $MoO_x$/Carbon nanocomposite gas sensor exhibited a higher response towards formaldehyde when compared to other VOCs, such as methanol, ethanol, acetone, and isopropyl alcohol. In addition, this nanocomposite sensor was able to detect concentrations of formaldehyde as low as 5 ppb.

Certain embodiments of the compositions, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions, devices, and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A sensor comprising:
   a base transducer;
   a carbon support on the base transducer;
   a $MoO_x$-based sensing element comprising $MoO_x$ on the carbon support, wherein x is from 2 to 3; and
   a solid-state electrolyte on the $MoO_x$-based sensing element;
   wherein the solid-state electrolyte comprises a sulfonated tetrafluoroethylene-based fluoropolymer-copolymer.

2. The sensor of claim 1, wherein the $MoO_x$-based sensing element comprises a combination of molybdenum (IV) oxide ($MoO_2$), molybdenum (V) oxide ($Mo_2O_5$), and molybdenum (VI) oxide ($MoO_3$).

3. The sensor of claim 1, wherein the $MoO_x$-based sensing element and the carbon support form a nanocomposite.

4. The sensor of claim 1, wherein the base transducer comprises a 2 mm gold working electrode, a Ag/AgCl reference electrode, and a Pt counter electrode.

5. The sensor of claim 1, comprising from 1 wt. % Mo/carbon to 30 wt. % Mo/carbon.

6. The sensor of claim 1, wherein the sensor is in a hand-held, portable device.

7. The sensor of claim 1, wherein the carbon support comprises carbon black.

8. The sensor of claim 1, wherein:
   the carbon support comprises carbon black; and
   the base transducer comprises a screen-printed gold electrode.

9. The sensor of claim 8, comprising from 1 wt. % Mo/carbon to 30 wt. % Mo/carbon.

10. A method of detecting formaldehyde gas, the method comprising:
    exposing the sensor of claim 1 to a gas phase comprising formaldehyde; and
    measuring a change in current of the sensor to detect the formaldehyde.

11. The method of claim 10, wherein the formaldehyde is present in the gas phase at a concentration as low as about 5 ppb.

12. The method of claim 10, wherein volatile organic compounds in addition to the formaldehyde are present in the gas phase.

13. The method of claim 10, wherein cyclic voltammetry is used to measure the current change of the sensor.

14. The method of claim 10, wherein electrochemical impedance spectroscopy is used to detect an impedance change and phase angle shifts due to interfacial interaction of the formaldehyde with the $MoO_x$-based sensing element.

15. The method of claim 10, wherein the formaldehyde is detected with a current change of 1.2 μA.

16. A sensor comprising:
    a base transducer;
    a carbon support on the base transducer;
    a $MoO_x$-based sensing element comprising $MoO_x$ on the carbon support, wherein x is from 2 to 3; and
    a solid-state electrolyte on the $MoO_x$-based sensing element;
    wherein the $MoO_x$-based sensing element and the carbon support form a nanocomposite.

* * * * *